(12) United States Patent
Glaser et al.

(10) Patent No.: US 8,829,136 B2
(45) Date of Patent: Sep. 9, 2014

(54) APPARATUS AND METHODS FOR CONTROLLED RADICAL POLYMERIZATION

(75) Inventors: David M. Glaser, New Britain, CT (US); Roderick Coffey, Middletown, CT (US); John G. Woods, III, Farmington, CT (US); Anthony F. Jacobine, Meriden, CT (US)

(73) Assignee: Henkel US IP LLC, Rocky Hill, CT (US)

( * ) Notice: Subject to any disclaimer, the term of this patent is extended or adjusted under 35 U.S.C. 154(b) by 226 days.

(21) Appl. No.: 12/946,895

(22) Filed: Nov. 16, 2010

(65) Prior Publication Data

US 2011/0060157 A1    Mar. 10, 2011

Related U.S. Application Data

(63) Continuation of application No. PCT/US2009/047579, filed on Jun. 17, 2009.

(60) Provisional application No. 61/073,626, filed on Jun. 18, 2008.

(51) Int. Cl.
*C08F 20/10* (2006.01)
*B01J 19/18* (2006.01)
*C08F 2/00* (2006.01)
*B01J 14/00* (2006.01)
*C08F 293/00* (2006.01)
*B01J 16/00* (2006.01)
*B01J 19/00* (2006.01)
*C08F 220/18* (2006.01)

(52) U.S. Cl.
CPC .......... *C08F 220/18* (2013.01); *B01J 2219/002* (2013.01); *B01J 2219/00069* (2013.01); *B01J 19/1881* (2013.01); *C08F 2/00* (2013.01); *B01J 14/005* (2013.01); *B01J 2219/00238* (2013.01); *B01J 2219/00094* (2013.01); *C08F 293/005* (2013.01); *B01J 2219/00162* (2013.01); *B01J 16/005* (2013.01); *B01J 2219/00213* (2013.01); *B01J 2219/00063* (2013.01); *B01J 19/0066* (2013.01); *B01J 2219/00231* (2013.01); *C08F 2438/01* (2013.01)
USPC ......................................................... 526/328

(58) Field of Classification Search
None
See application file for complete search history.

(56) References Cited

U.S. PATENT DOCUMENTS 5,763,548 A     6/1998  Matyjaszewski et al.
5,854,364 A  *  12/1998  Senninger et al. ............ 526/192

(Continued)

FOREIGN PATENT DOCUMENTS

JP      2000053723      2/2000
JP      2006199728      8/2006

OTHER PUBLICATIONS

Braunecker, W.A. et al. "Controlled/living radical polymerization: Features, developments, and perspectives" Progress in Polymer Science, Elsevier, vol. 32, 2007, pp. 93-146.

(Continued)

*Primary Examiner* — Karl J Puttlitz
(74) *Attorney, Agent, or Firm* — Steven C. Bauman

(57) ABSTRACT

A method of conducting controlled radical polymerization, including: (a) providing a mixture of at least one monomer; at least one monomer solvent; at least one compound metal coordinating capable; and at least one initiator; (b) directing the mixture at a rate over a solid catalyst surface contained in an external chamber to the vessel, the catalyst including a metal or metal compound capable of at least two oxidation states; (c) monitoring the reaction vessel temperature; (d) adjusting the flow rate when the temperature is outside a selected temperature range; and (e) allowing the polymerization to proceed to desired conversion level.

24 Claims, 14 Drawing Sheets

(56) References Cited

U.S. PATENT DOCUMENTS

| | | | |
|---|---|---|---|
| 6,602,965 B1 * | 8/2003 | Terazawa et al. | ............... 526/64 |
| 6,639,029 B1 | 10/2003 | Scherer et al. | |
| 2004/0204556 A1 | 10/2004 | Matyjaszewski et al. | |
| 2005/0131186 A1 | 6/2005 | Percec et al. | |
| 2006/0089474 A1 | 4/2006 | Yamazaki et al. | |

OTHER PUBLICATIONS

Kickelbick, Guido, at al. "Immobilization of the Copper Catalyst in Atom Transfer Radical Polymerization" Macromolecules, American Chemical Society, vol. 32, No. 9, Sep. 4, 1999, pp. 2941-2947.

Percec, Virgil, et al. "Ultrafast Synthesis of Ultrahigh Molar Mass Polymers by Metal-Catalyzed Living Radical Polymerization of Acrylates, Methacrylates, and Vinyl Chloride Mediated by SET at 25 °C" American Chemical Society, vol. 128, No. 43, 2006, 14156-14165.

Matyjaszewski, K., et al. "Competitive Equilibria in Atom Transfer Radical Polymerization" Macromolecular Symposia, Wiley-VCH Verlag GmbH & Co. KGaA, vol. 248, 2007, pp. 60-70.

Percec, Virgil, at al. "A Comparative Computational Study of the Homolytic and Heterolytic Bond Dissociation Energies Involved in the Activation Step of ATRP and SET-LRP of Vinyl Monomers" Journal of Polymer Science: Part A: Polymer Chemistry,-Wiley Interscience, vol. 45, 2007, pp. 1607-1618. Retreived from http://onlinelibrary.wiley.com/doi/10.1002/pola.21927/pdf on Nov. 13, 2013.

* cited by examiner

APPARATUS AND METHODS FOR CONTROLLED RADICAL POLYMERIZATION

FIELD OF THE INVENTION

The invention is related to methods for the controlled radical polymerization of monomers. More particularly, the invention relates to methods for living radical polymerization of monomers with, inter alia, increased conversion, low polydispersity, high functionality of the polymer product ends, and a monomodal distribution of molecular weight.

BACKGROUND OF THE INVENTION

There is a constant demand for economic and efficient ways to produce polymers. Atom Transfer Radical Polymerization (hereinafter ATRP) provides a method to build polymers. However, this process is limited in use and has drawbacks in both the method and final products obtained from the method. ATRP can be performed on a narrow range of monomers with a narrow range of initiators. Also, ATRP is typically catalyzed with a metal in the +1 (or $M^{+1}$), or other lower oxidation state, such as a Cu(I) salt catalyst. As the polymerization process is slow, high concentrations of the catalyst are needed to drive the reaction as are high temperatures which must be maintained for a prolonged period of time. Though functional ends are desirable for the final product polymer, ATRP catalyst can be unstable and promote termination concomitant with formation of non-functionalized end groups. Thus, ATRP generally gives material containing some non-functionalized polymer with unreactive end groups. As a result, a typical polymer produced by ATRP may contain in the region of 10-15% of the chain ends terminate to provide material with less desirable mechanical and material properties and characteristics. Both the molecular weight and the polydispersity index of the product diverge from theory by the premature termination of the polymer ends, which often results in poor rheological control and impracticability in various applications and uses. Thus, the lack of control of the ATRP process results in polymer products with structural defects, less desirable features, and less predictable characteristics. In addition, Cu(I) salts are unstable in air and require care in handling.

As a high concentration of catalyst is needed to drive the reaction, this process requires purification to remove the catalyst which is often extensive and difficult. In order to improve the predictability and reproducibility, ATRP is typically done in small scale reactions. Thus, there exists a need in the art for a method of radical polymerization which is efficient, effective, and can produce controlled polymer products with desirable properties, characteristics, and features reliably, as well as on a large-scale level.

SUMMARY OF INVENTION

A first aspect of the invention provides: a method of conducting controlled radical polymerization, including: (a) charging a reaction vessel with a mixture of: at least one monomer; at least one solvent for the monomer; at least one compound capable of coordinating with a metal; and at least one initiator; (b) directing the reaction mixture at a flow rate over a solid catalyst surface contained in a chamber external to the reaction vessel, the catalyst surface including a metal or metal compound capable of at least two oxidation states; (c) monitoring the temperature of the reaction vessel within a selected temperature range; (d) adjusting the flow rate when the temperature is outside the selected temperature range; and (e) allowing the polymerization to proceed until a desired conversion level is reached.

A second aspect of the invention provides: a method of conducting controlled radical polymerization, including: (a) charging a reaction vessel with a mixture of: at least one monomer; at least one solvent for the monomer; at least one compound capable of coordinating with a metal; and at least one initiator; (b) directing the reaction mixture at a flow rate through at least one catalytic converter chamber or a series of catalytic converter chambers external to the mixture, separated by heat exchanger units, and over a catalytic converter surface, the catalytic converter surface including a metal or metal compound capable of at least two oxidation states; (c) monitoring the temperature of the reaction vessel within a selected temperature range; (d) maintaining the temperature of the reaction mixture by adjusting the flow rate through the catalytic chambers and heat exchanger units when the temperature is outside the selected temperature range.

A third aspect of the invention provides: a method of conducting controlled radical polymerization, including: (a) charging a reaction vessel with a mixture of at least two of: at least one monomer; at least one solvent to facilitate disproportionation of a catalyst; and at least one ligand; (b) directing the reaction mixture at a flow rate over a catalytic converter surface external to the mixture, the catalytic converter surface including a metal or metal compound capable of at least two oxidation states; (c) determining when a desired level of catalyst is solubilized into the reaction mixture, and subsequently incorporating at least one initiator into the reaction mixture; (d) monitoring the temperature of the reaction vessel within a selected temperature range; (e) adjusting the flow rate when the temperature is outside the selected temperature range; and (f) allowing the polymerization to proceed until a desired conversion level is reached.

A fourth aspect of the invention provides: a method of obtaining monomodal distribution of polymer molecular weight, including: providing a reaction composition which is capable of disproportionating a metal or a metal compound, the composition including: at least one monomer; at least one solvent for the monomer; at least one ligand; and at least one initiator; directing the composition at a flow rate over a catalytic converter surface external to the composition to permit the disproportionation; (c) monitoring the temperature of the reaction vessel within a select temperature range; (d) adjusting the flow rate when the temperature is outside the selected temperature range; and (e) allowing the polymerization to proceed until a desired conversion level is reached.

A fifth embodiment of the invention provides an apparatus for controlled living radical polymerization, including: a reaction vessel, the vessel configured to house a material the vessel having a vessel inlet and a vessel outlet; at least one catalytic converter, the converter disposed externally to the reaction vessel and having a converter inlet and a converter outlet, the converter configured to house a solid metal catalyst and provide a surface area for the material to contact the catalyst, the catalyst in communication with the reaction vessel; a pump for controlling the rate at which the material is pumped into the converter and contacted to the catalyst; and at least one heat exchanger, wherein the heat exchanger is disposed between the converter outlet and the reaction vessel inlet.

These and other features of the invention will be better understood through a study of the following detailed description and accompanying drawings.

DETAILED DESCRIPTION OF THE PRESENT INVENTION

Figure 1:
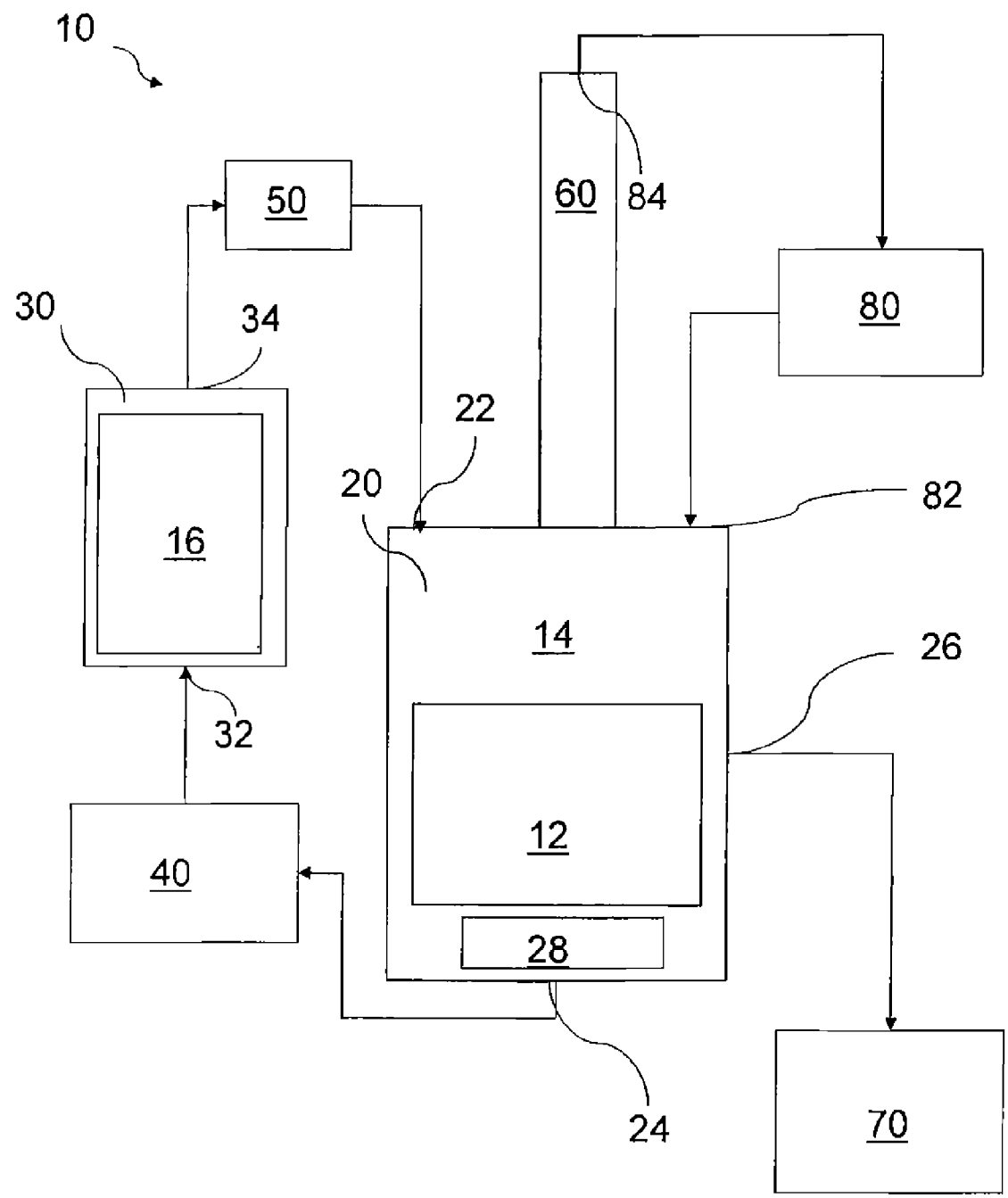
FIG. 1 depicts an embodiment of a flow chart of the apparatus of the present invention.

The embodiments of the present invention meet the need in the art for a method of radical polymerization which is efficient, effective, and can reliably produce controlled polymer products with desirable properties, characteristics, and features. Further, the methods of the present invention may be practiced on a small, large, or commercial scale with the same level of practicability and predictability of the results.

There is a continuing effort in polymer chemistry to develop new polymerization processes and new polymers. As such, Single Electron Transfer Living Radical Polymerization (hereinafter, SET-LRP) has developed as an alternative to ATRP. While both processes refer to methods of radical polymerization of polymers, SET-LRP and ATRP have several distinctions, which yield contrasting differences in their uses as well as the properties and characteristics of final products obtained therefrom. With the methods of the present invention, either process, or both may be practiced, yielding better results including: higher conversion rates, more efficient processes, and products with higher predictability and desirability.

A controlled or living polymerization process is one in which chain transfer and termination reactions are essentially nonexistent relative to the polymer propagation reaction. These developments have led to the production of polymers that exhibit precise and quantitative functionality and to the development of functional polymers that possess specific chemical reactivity. The methods of the present invention extend the level of control available to materials engineers in processing polymers and using polymers as building blocks in, or components for, subsequent material forming reactions, such as copolymerizations, chain extensions and crosslinking reactions, and interaction with substrates, including dispersed solids. The invention meets the need for a catalyst system for controlled polymerization that is easily separable from the reaction medium and provides sufficient control over the process.

There has been a continuing effort to make the controlled radical polymerization as environmentally benign and as low cost a process for the preparation of functional materials as possible. Factors such as control over the polymer molecular weight, molecular weight distribution, composition, architecture, and functionality are important considerations in the design and execution of such methods. The methods of the present invention allow for greater control over the final polymer products such that the desired chain length, polydispersity, molecular weight, and functionality are easily incorporated into the final product. Thus, the present invention overcomes the poor control over molecular weight distribution, low functionality, poor control of polymer rheology, and undesirable polydispersity. Also, because this process is so predicable, it can be easily implemented on a large scale with a high predictability and/or used to tailor the properties of the final polymer products to new degrees, and products can be designed based on their properties. Further, because there is less termination, the structure and composition of the polymer are more precise and the end product has more desirable properties and characteristics to promote a better product. Further, as very low levels of catalyst are needed to drive the reaction, purification of the final product is facilitated, and at times, unnecessary. Further, the components of the system may be optimized to provide even more precise control over the (co)polymerization of monomers.

The products of the present invention may be used to provide curable resin compositions useful as contact adhesives with a prolonged tack retention period, without affecting the final bond composition. The polymers of the methods also exhibit good oil resistance, heat resistance, adhesiveness and flexibility. Further, the products encompassed by the methods of the present invention can be widely used as plastics, elastomers, adhesives, emulsifiers, thermoplastic elastomers, etc.

Desirable polymers from the method have certain properties and characteristics. For example, the final polymer product should have a high thermal resistance for its use in various applications and fields of technology. Desirably, the final polymer product may be predictably produced to have high functionality on the ends of the polymer, a low polydispersity, and a molecular weight close to the theoretical molecular weight. While values and measurements of these features are provided in the Examples section herein, a brief discussion of each of the properties follows.

The degree of polymerization is the number average molecular weight divided by the weighted average molecular weight of all monomers in the feed, which, in a controlled polymerization, is a linear function of monomer conversion. Controlled Radical Polymerization (hereinafter, "CRP") requires the following two conditions: the initiation should be sufficiently fast so that nearly all chains start to grow simultaneously; and little or no chain transfer occurs to increase the total number of chains. It is well known to those skilled in the art of polymers that when the polydispersity index of a polymer is broad, the polymer contains polymeric segments with substantial smaller and larger molecular weight segments than the number average molecular weight of the polymer. On the one hand, low molecular weight segments may have an adverse effect on physical properties of the polymer such as tensile strength, elongation and flexural modulus; while on the other hand, very large molecular weight segments may result in high melt viscosity of the polymer which may produce limitations in the processability of the polymer. Thus, there are distinct advantages when the final polymer has a well defined and narrow polydispersity index. This permits a more predictable polymer product from a property perspective and minimizes the aforementioned disadvantages.

The present invention provides for more predictable end group functionality, i.e. higher efficiency of the desired functionalized end groups may be achieved, with substantially less premature termination reactions which would otherwise result in undesired truncation of the polymer chain, lack of functional end groups and an unpredictable molecular weight of the final product. Reactive halo-functional end groups may undergo reinitiation and further polymerization to produce block copolymers, or may be further functionalized through nucleophilic substitution, elimination or end capping reactions. The present invention permits efficient and predictable end group functionality in the final polymer product.

It is desirable to have a narrow molecular weight distribution i.e. polydispersity index in the final polymer product. A narrow molecular weight distribution may be achieved from the controlled polymerization in accordance with the present invention, as the chain length, end group functionality, and consistency of the polymer is substantially constant. In achieving a narrow molecular weight distribution, several factors may be promoted. Some factors which contribute to a narrow molecular weight distribution include: (1) a rate of initiation, which is competitive with the rate of propagation (allowing the simultaneous growth of all the polymer chains); (2) the exchange between species of different reactivities being faster than propagation (ensuring that all the active chain termini are equally susceptible to reaction with monomer for a uniform growth); (3) low to no chain transfer or termination; (4) the rate of activation versus deactivation; and (5) a homogenous system where mixing is sufficiently fast (all active centers are introduced at the onset of the polymerization). A polymerization which meets these factors may have a polydispersity close to the theoretical value of the Poisson distribution 1+1/DP. For example, the DP of the polymer products of the present methods may be below 1.4 DP, more specifically less than 1.2 DP, in certain cases less than 1.1.

Another characteristic of the final product is long-lived polymer chains. This refers to all chains retaining their active centers after full consumption of the monomer. Thus, propagation resumes upon the introduction of an additional monomer. This factor enables the preparation of block copolymers by sequential monomer addition.

Controlled polymerization provides the best opportunity to control the bulk properties by selection and control of various aspects of the multitude of variations in composition, functionality and topology at a molecular level. With the methods of the present invention, many of the characteristics and factors previously discussed can be controlled in order to ensure that the polydispersity, molecular weight, functionality, and long-lived chain length are promoted in the final polymer product. For example, polydispersity may be controlled in the present invention by ensuring that the rate of deactivation is the same or greater than the rate of initial propagation (activation).

Some embodiments of the present invention relate to a polymerization process for the control of the microstructure of polymers and copolymers. Some embodiments of the present invention relate to living radical polymerization of halogen-containing and acrylic monomers utilizing organohalide initiators and to the formation of polymers therefrom. The processes of the various embodiments provide final polymer products which have narrow molecular weight distributions, which are obtained by high and efficient conversion and rapid or ultrafast polymerization reactions. Thus, the final polymer products obtained through the present methods have predictable molecular weights, a low polydispersity index, and high functionalities.

FIG. 1 provides an embodiment of an apparatus 10 of the invention depicted in flowchart form. The apparatus 10 for controlled living radical polymerization includes a reaction vessel 20; a catalytic converter 30; a pump 40; and a heat exchanger 50. The reaction vessel 20 may be configured to house a material 12. The material 12 may include various reagents, components, intermediates, products, and the like. The reaction vessel 20 may be configured with at least one vessel inlet 22 and vessel 24 outlet. It should be understood that the reaction vessel 20 may be configured to include a plurality of inlets and outlets for various functions and applications, as may be desired.

The catalytic converter 30 may be separate from the reaction vessel 20, but attached thereto. Various tubing and lines may be employed to connect the various components to one another, as is referenced by the lines connecting the various components in FIG. 1. The catalytic converter 30 may be disposed externally to the reaction vessel such that the materials 12 in the reaction vessel 20 may be directed out of the reaction vessel 20 and into the catalytic converter 30. Thus, the catalytic converter 30 may have a converter inlet 32 and a converter outlet 34. The catalytic converter 30 houses a solid metal catalyst 16. The solid metal catalyst may be of one of more forms as later discussed. Preferably, the solid metal catalyst is a screen. The catalytic converter may be of a size, shape, and configuration to allow and promote the material 12 to be fed through the converter inlet 32 and contacted to the catalyst 16. The contact time and surface area may be optimized as desired. After the material 12 contacts the catalyst in the catalytic converter, the material may be fed through the converter outlet 34 to exit the catalytic converter 30.

The apparatus 10 further includes a pump 40. The pump 40 may be used to control the flow rate at which the material 12 is pumped from the reaction vessel 20 to the catalytic converter 30. Thus, the pump 40 may control the rate at which the material 12 contacts the surface of the catalyst 16. The pump 40 may be a combination of mechanical, electrical, and electromechanical components, and may, inter alia, employ gravity (as is shown in the outlet line 34 from the catalytic converter 30 back into the reaction vessel).

With continued reference to FIG. 1, the apparatus 10 may include at least one heat exchanger 50. The heat exchanger 50 may be disposed between the converter outlet 34 and the reaction vessel inlet 22. As such, the heat exchanger 50 may be used to exchange heat into or out of the material 12 in order to maintain the material 12 and thereby the reaction vessel 20 at a desired temperature or temperature range. There may be more than one heat exchanger 50, for example, located on the reaction vessel 20, in-line with the pump 40 or before the converter inlet 32 for the catalytic converter 30. Similarly, it may be desirable to measure the temperature at various points along the apparatus 10 or into the mixture 12 or the catalyst surface 16 with one or more thermometers in order to ensure that a desired temperature is maintained throughout a reaction sequence.

The apparatus 10 may include an analytical instrument 70. The analytical instrument 70 may be an in-line analytical instrument. The analytical instrument 70 may be configured through a second inlet 26 in the reaction vessel 20. Also, samples may be pulled from the reaction vessel 20 in order to run through the analytical instrument 70 which may be separate from the apparatus 10. The analytical instrument 70 may be one or more as disclosed and discussed infra, including nuclear magnetic resonance, spectroscopy, spectrophotometry, high pressure permeation chromatography, and the like. The analytical instrument 70 may be employed in-line to determine, for example the rate of the reaction, the level of conversion, the relative yield, the existence of side-reactions, impurities, characteristics of intermediates, et cetera.

The apparatus 10 of may also include an agitator 28 which may be disposed in the reaction vessel. The agitator may stir the material 12 in the reaction vessel 20 in order to resist high surface tension of the material resistant or resilient to pumping. Further, the agitator 28 may ensure that the reagents are blended to maximize surface area contact and promote the reaction. For example, the agitator 28 may be an impellor, a mechanical stir bar, or a magnetic stir bar with a corresponding adjustable RPM stirrer below the reaction vessel 20.

The apparatus 10 may have an environment which is sealed to air, and particularly, oxygen, in the atmosphere. Thus, the apparatus 10 may further comprise a gas source 80 having a gas inlet 82, and a gas outlet 84. The gas inlet 82 and gas outlet 84 may be configured to the reaction vessel 20 to allow a gas 14 to purge the reaction vessel 20 and the catalytic converter 30. Gases which may be employed with the apparatus 10 include non-reactive gases. Examples of such gases may include argon and nitrogen. Further, it may be desirable to filter the gas 14 which exits through the gas outlet 84 through a desiccant or other components to remove material 12 from the gas 14 so that it may be properly disposed of.

The apparatus 10 may further comprise a condenser 60. The condenser 60 may be configured to insert in-line between the reaction vessel 20 and the gas outlet 84 of the gas source 80. The condenser 60 may be jacketed by cold water or dry ice (cold air) in order to prevent material 12 from leaving the reaction vessel 20 with the gas 14 as it exits the condense through the gas outlet 84. The various chemical components including the catalyst 16, the material 12, and the gas 14, employed in the embodiments of the present invention will be discussed in greater detail with reference to the methods of the invention. The methods of the invention may be performed in the exemplary apparatus of FIG. 1, or in its equivalents, as is known in the art.

Figure 2:
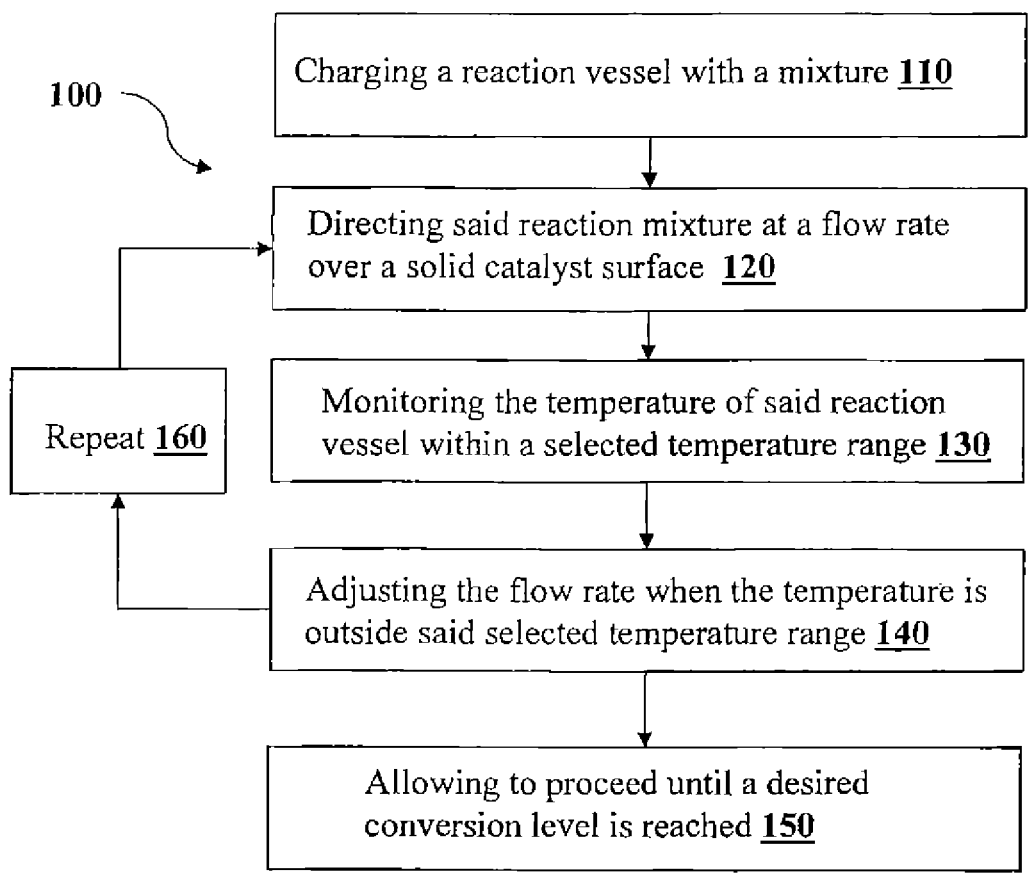
FIG. 2 depicts an embodiment of a method of conducting controlled radical polymerization.

FIG. 2 provides an embodiment of a method of the invention depicted in a flowchart for conducting controlled radical polymerization. The method 100 may include the steps of: (a) charging 110 a reaction vessel 20 with a mixture of at least one monomer; at least one solvent for the monomer; at least one compound capable of coordinating with a metal; and at least one initiator; (b) directing 120 the reaction mixture at a flow rate over a solid catalyst surface 16 contained in an external chamber 30 to the reaction vessel 20, the catalyst surface 16 comprising a metal or metal compound capable of at least two oxidation states; (c) monitoring 130 the temperature of the reaction vessel 20 within a selected temperature range; (d) adjusting 140 the flow rate when the temperature is outside the selected temperature range; and (e) allowing 150 the polymerization to proceed until a desired conversion level is reached. Steps of the method 100 may be repeated, as is shown in FIG. 2. For example, steps (b) through (d) may be repeated 160 until a desired conversion level is reached.

Figure 3:
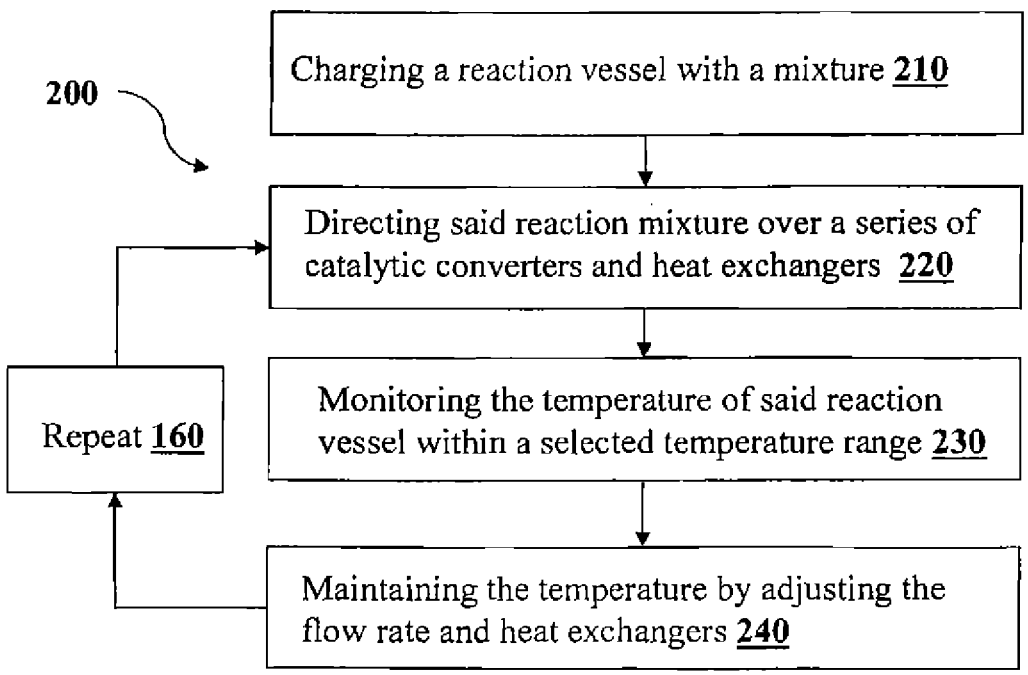
FIG. 3 depicts another embodiment of a method of conducting controlled radical polymerization.

Another embodiment of the present invention provides a method 200 of conducting controlled radical polymerization, as shown in FIG. 3. The method 200 includes the steps of: (a) charging 210 a reaction vessel 20 with a mixture of: at least one monomer; at least one solvent for the monomer; at least one compound capable of coordinating with a metal; and at least one initiator; (b) directing 220 the reaction mixture at a flow rate through at least one catalytic converter chamber or a series of catalytic converter chambers external to the mixture and desirably external to the reaction vessel, and over a catalytic converter surface, the catalytic converter surface including a metal or metal compound capable of at least two oxidation states; (c) monitoring 230 the temperature of the reaction vessel 20 within a selected temperature range; (d) maintaining 240 the temperature of the reaction mixture by adjusting the flow rate through the catalytic chambers 30 and heat exchanger 50 units when the temperature is outside the selected temperature range. Similarly, one or more of the steps may be repeated or reiterated as may be desired.

Method 200, as well as other embodiments, may be carried out using a plurality of heat exchangers 50, which may be used to limit the exotherm of a large-scale reaction. One or more heat exchanger 50 units may be placed in series, in parallel or other arrangement with one or more catalytic converter chambers 30, e.g. heat exchange 50 units may be placed in series in alternating fashion with the catalytic converters 30. Multiple heat exchanger 50 units may also be placed between two catalytic converter chambers 30. Also, a plurality of catalytic converter chambers 30 may be employed. The catalytic converters 30 may be located in series, parallel, or as alternate routes. For example, an alternate route may be employed in order to change the direction of flow once the surface of one catalytic converter 30 has been exhausted.

Figure 4:
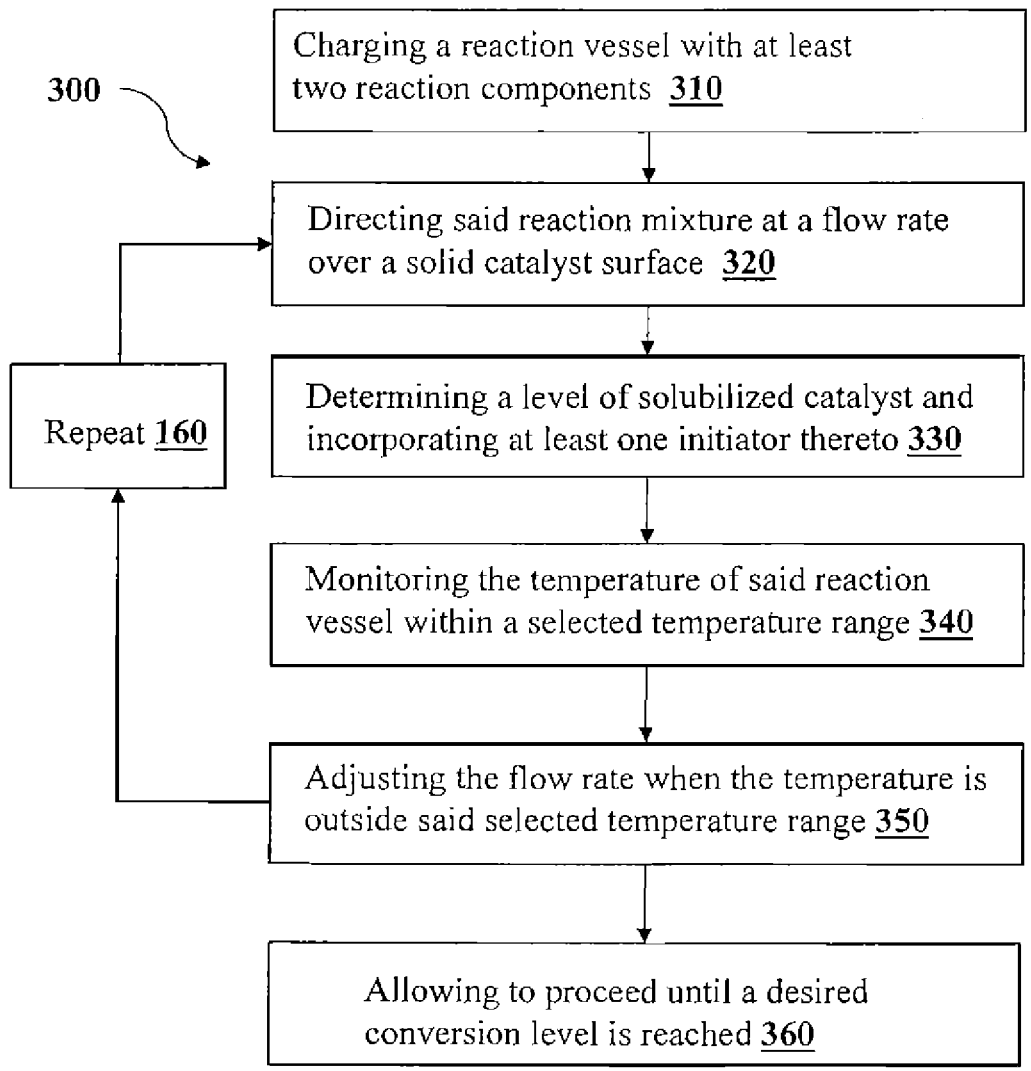
FIG. 4 depicts still another embodiment of a method of conducting controlled radical polymerization.

A further embodiment of the present invention includes a method 300 of conducting controlled radical polymerization, as shown in FIG. 4. The method 300 includes: (a) charging 310 a reaction vessel 20 with a mixture of at least two of: at least one monomer; at least one solvent to facilitate disproportionation of a catalyst; and at least one ligand; (b) directing 320 the reaction mixture at a flow rate over a catalytic converter surface external to the mixture and desirably external to the reaction vessel, the catalytic converter surface including a metal or metal compound capable of at least two oxidation states; (c) determining 330 when a desired level of catalyst is solubilized into the reaction mixture, and subsequently incorporating at least one initiator into the reaction mixture; (d) monitoring 340 the temperature of the reaction vessel 20 within a selected temperature range; (e) adjusting the flow rate 350 when the temperature is outside the selected temperature range; and (f) allowing 360 the polymerization to proceed until a desired conversion level is reached.

Figure 5:
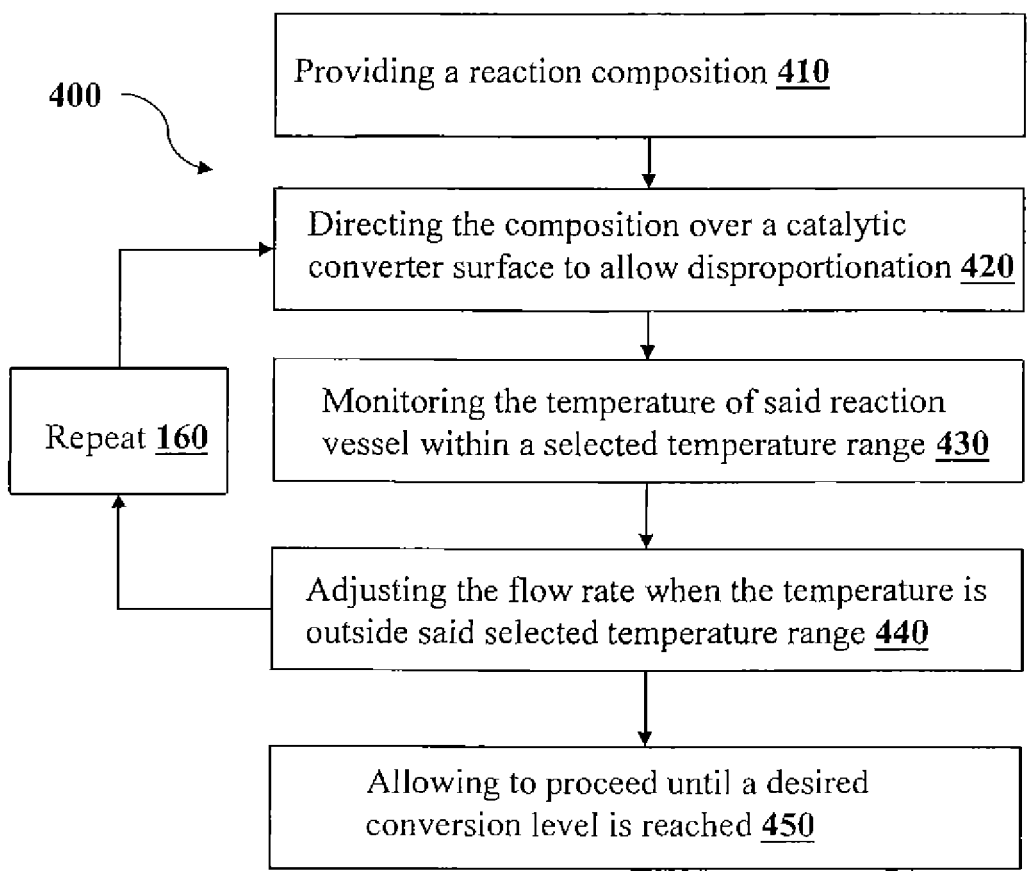
FIG. 5 depicts an embodiment of a method of obtaining monomodal distribution of polymer molecular weight.

Still another embodiment of the present invention provides a method 400 of obtaining monomodal distribution of polymer molecular weight, as shown in FIG. 5. The method 400 includes providing 410 a reaction composition which is capable of disproportionating a metal or a metal compound, the composition including: at least one monomer; at least one solvent for the monomer; at least one ligand; and at least one initiator; (b) directing 420 the composition at a flow rate over a catalytic converter surface external to the composition, and desirably outside the reaction vessel 20, to permit the disproportionation; (c) monitoring 430 the temperature of the reaction vessel 20 within a select temperature range; (d) adjusting 440 the flow rate when the temperature is outside the selected temperature range; and (e) allowing 450 the polymerization to proceed until a desired conversion level is reached.

One or more of the referenced methods 100, 200, 300, 400 may further include the step of measuring a conversion level of the reaction mixture with an analytical instrument. The analytical instrument 70 may be one or more commonly known and used in the art in order to measure identifying characteristics of various compounds and mixtures. Desirably, the analytical method may be controlled in-line to measure the rate of conversion as a function of time as the process proceeds. Alternatively, aliquots or samples can be taken from the mixture and conversion measured off-line.

Non-limiting examples of useful analytical instruments 70 and methods may be selected from: spectroscopy devices, chromatography instruments, nuclear magnetic resonance instruments, mass spectronomer instruments, gel permeation chromatography techniques, and combinations of these instruments or techniques. As previously stated, the analytical instrument 70 may either be in-line or separate from to the apparatus 10, with samples withdrawn from the reaction vessel 20.

The conversion level may be measured by spectroscopic analysis. For example, the analysis and characterization of the final product may be completed by infrared spectroscopy. This may include, UV-VIS IR, Spectrophotometry, FTIR analysis, as well as other spectroscopic techniques. For example, one useful analytical instrument 70 may be a Fourier Transform Infrared spectrophotometer configured with a probe in the reaction vessel to take periodic measurements of the level of conversion of the reaction mixture as the reaction proceeds.

Alternatively, the relative viscosity increase of the reaction mixture may be determined by means of a stirrer fitted with a torque analyzer and correlated to monomer conversion through an independent calibration. Also, it should be noted that samples can be withdrawn periodically from the reactor and analyzed externally by such techniques as NMR, GPC, refractive index, light absorption, colorometrically etc.

Further, though the degree of conversion may be measured analytically, it may also be measured theoretically. This may be done, for example, by measuring the input into catalytic converter 30 and calculating the oxidation of used catalyst 16 to determine how much catalyst 16 is used in the reaction.

Figure 7:
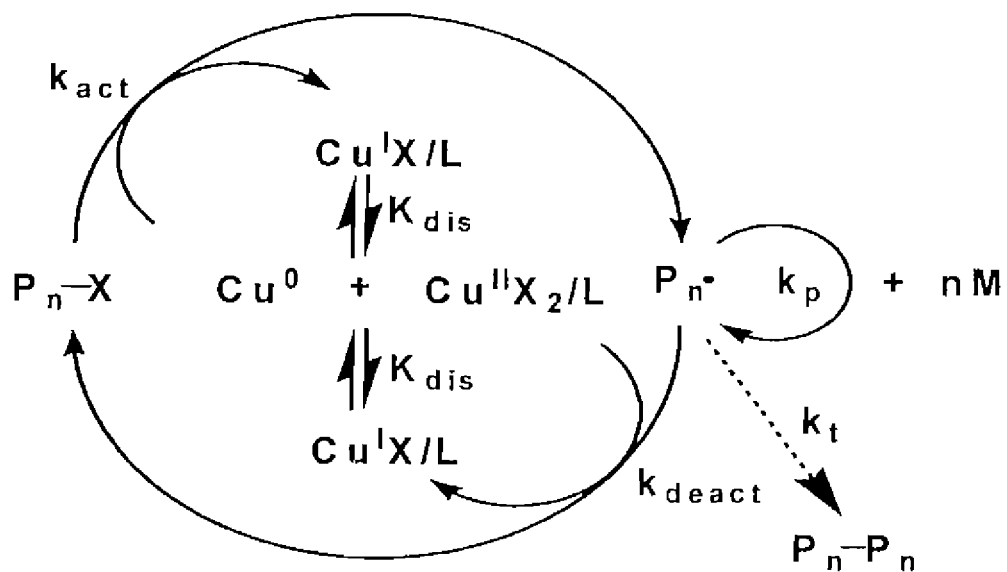
FIG. 7 depicts a proposed mechanism for the single-electron transfer mechanism.

Specifically, one or more of the methods 100, 200, 300, 400 may include a single electron transfer living radical polymerization (SET-LRP) reaction. Without wishing to be bound to any particular mechanism, a proposed mechanism for this process is shown in FIG. 7. A discussion of the proposed mechanism as depicted in FIG. 7 may be found, for example, in Percec, V. et al; "*Ultrafast Synthesis of Ultrahigh Molar Mass Polymers by Metal-Catalyzed Living Radical Polymerization of Acrylates, Methacrylates, and Vinyl Chloride Mediated by SET at 25° C.*", 9 J. AM. CHEM. SOC. 2006, 128, 14156-14165, which is incorporated herein by reference in its entirety. SET-LRP may be performed at lower activation energies and, thus, lower temperatures. With reference to FIG. 7, elemental metal, including for example, copper can be employed with certain solvents which promote disproportionation to give Cu(0) and Cu(II). Thus, Cu(II) is immediately available for the deactivation step, which lowers the amount of the terminated product (creating a narrower molecular weight distribution and polydispersion). Also, the catalyst metal, such as copper, regenerates itself, thus, the polymerization process is living. Increasing solvent concentration of the reaction mixture leads to faster polymerization while maintaining good control over molecular weight and molecular weight distribution.

The SET-LRP reaction starts with an SET reaction between Cu(0) species and the halogen-containing substrate (initiator or halogen-terminated polymeric chain end). Any polar solvent facilitates the decrease of interaction between the anion (X−) and the electrophilic radical (R¥) from the radical-anion pair. The radical-anion cluster and Cu/L+ countercation must be in close proximity in the so-called caged ion pair, thus further facilitating decomposition of the radical anion into the electrophilic radical and the anion (X−). The reaction between a radical and the deactivator CuX2/ligand in polar media is a more complex process. One of the possible mechanisms may involve the transfer of the halide anion X from the deactivator to the propagating macroradical R¥, leading to a similar ion cage composed of a radical-anion [R—X]¥− and a CuX/L+ countercation. With SET-LRP, there is an acceleration of the "Cu(I)X"-catalyzed LRP initiated with alkyl halides, sulfonyl halides, and N-halides is observed in $H_2O$, alcohols, ethyleneglycol, DMSO, DMF, and ionic liquids, including for example, a high molar mass material like polymethacrylate.

This polymerization proceeds by an outer-sphere SET mechanism in which Cu(0) species act as electron donors, and the dormant initiator and propagating R—X species act as electron acceptors. By contrast with other metal-catalyzed LRPs, including ATRP, in which excess Cu(II)X2 species are created by the undesired radical dimerization, here, the Cu(II)X2 species responsible for the reversible deactivation of the radicals are formed by the disproportionation of Cu(I)X. The outer-sphere SET process involved in this new polymerization has very low activation energy. Therefore, SET-LRP involves very fast activation and deactivation steps and negligible bimolecular termination at room temperature.

Figure 8:
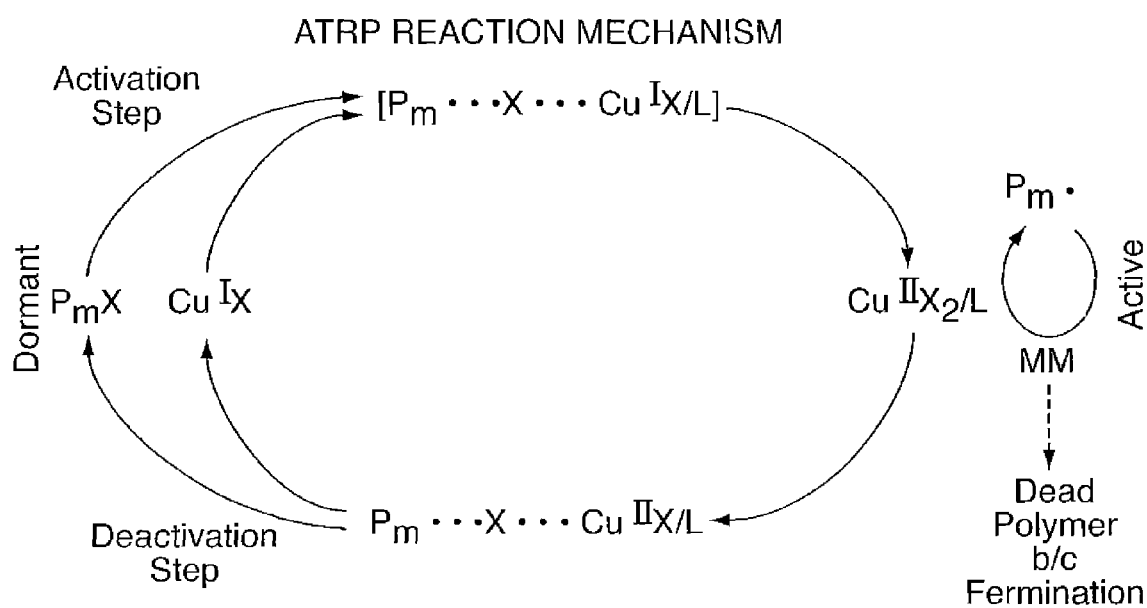
FIG. 8 depicts a proposed mechanism for the atom transfer radical polymerization mechanism.

One of more of the methods 100, 200, 300, 400 may alternatively be performed as an atom transfer radical polymerization (ATRP). Without being bound to any particular mechanism, a proposed mechanism for this process is shown in FIG. 8. A discussion of the proposed mechanism as depicted in FIG. 8 may be found, for example, in K. Matyjaszewski, K. et al., "*Competitive Equilibria in Atom Transfer Radical Polymerization*" Macromol. Symp. 2007, 248, 60-70, (DOI: 10.1002/masy.200750207), which is incorporated herein by reference in its entirety. Metal-catalyzed organic radical reactions and living radical polymerizations (LRP) performed in nonpolar solvents, including atom-transfer radical polymerization (ATRP), proceed by an inner-sphere electron-transfer mechanism that requires high activation energies. ATRP is considered to proceed by an innersphere electron-transfer mechanism in which a low oxidation state metal complex acts as the catalyst, mediating a fast exchange between radicals and their dormant alkyl halide species. The equilibrium between active and dormant species is shifted toward the dormant species by an excess of a high oxidation state catalyst generated by a small extent of bimolecular radical dimerization during the initial stages of the polymerization. This concept is known as internal suppression of fast reactions or the persistent radical effect (PRE). The inner-sphere radical process is also known as atom-transfer radical addition, and the corresponding radical polymerization was, therefore, named atom-transfer radical polymerization (ATRP). Further, a comparative discussion between ATRP and SET-LRP proposed mechanisms may be found, for example, in Percec, V. et al., "*A Comparative Computational Study of the Homolytic and Heterolytic Bond Dissociation Energies Involved in the Activation Step of ATRP and SET-LRP of Vinyl Monomers*" Journal of Polymer Science, DOI 10.1002/pola (published online Wiley InterScience available at http://www.interscience.wiley.com, which is incorporated by reference in its entirety.

Optionally, one or more of the methods 100, 200, 300, 400 of the present invention may include a combination of a single electron transfer radical living polymerization and an atom transfer radical polymerization. That is, the method may be performed as a hybrid ATRP/SET-LRP reaction sequence. As such, the method may include the addition of an elemental metal and a metal at the (at least) +1 oxidation state. By using two forms of catalyst, the polymerization reaction may be accelerated. With a combination of ATRP and SET-LRP mechanism, the results may be additive, synergistic, or provide other benefits, for example, lower cost reagents may be employed or better characteristics of the final product may be obtained.

The adjusting of the flow rate step referenced in various embodiments and as set forth in the methods 100, 200, 300, 400 may include, for example, increasing the flow rate, decreasing the flow rate, stopping the flow rate, reversing the flow, and combinations thereof, performed over the reaction sequence. This may be done by changing the rate of a pump, adjusting a gravity addition apparatus 10, or otherwise increasing, decreasing, starting stopping, or reversing the contact of the reaction mixture to the catalyst surface 16.

Figure 6:
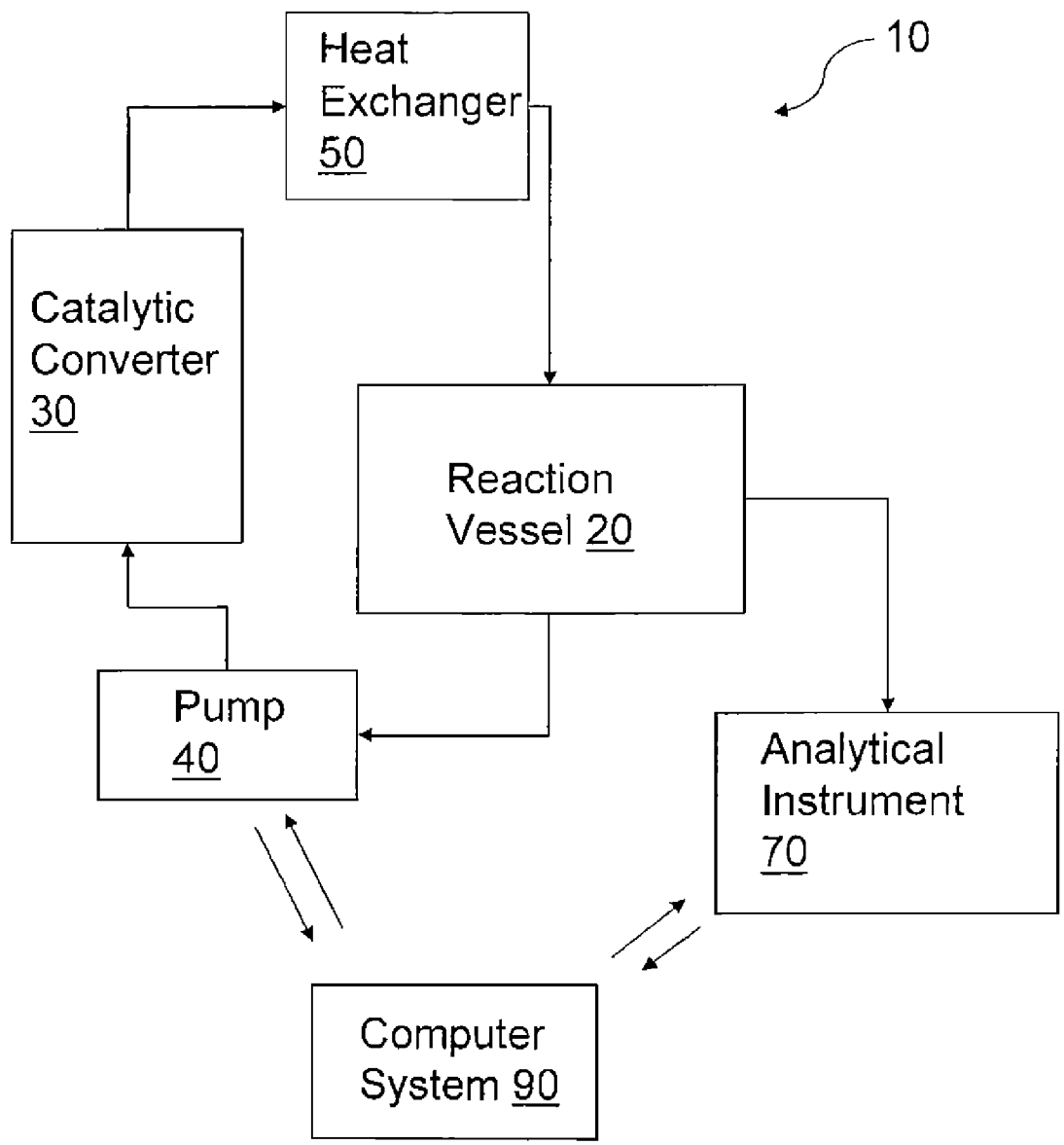
FIG. 6 depicts a flow chart of a proposed path of the reaction mixture through a block diagram representation of the apparatus of the present invention.
Figure 9:
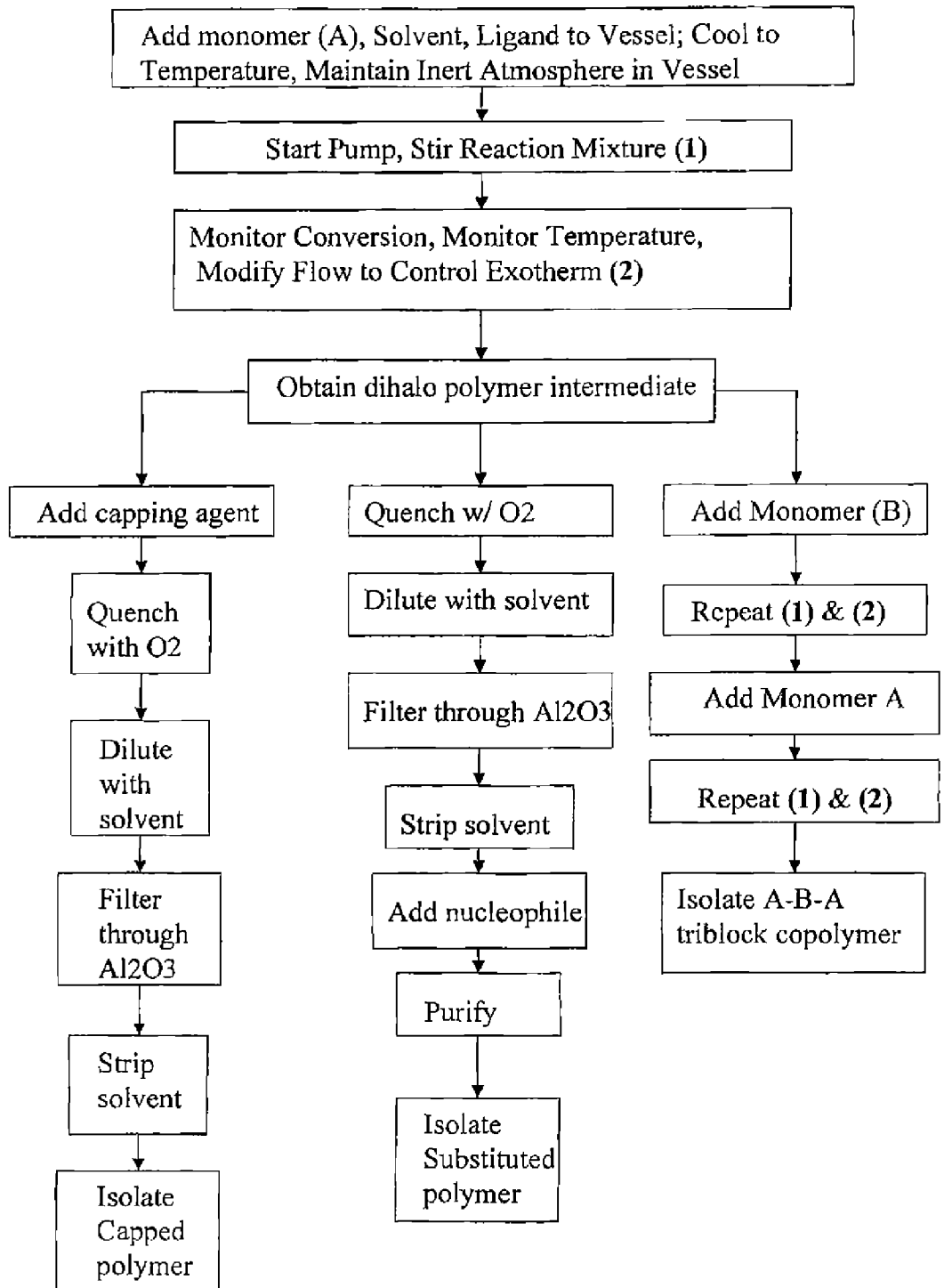
FIG. 9 depicts a step by step flow chart to obtaining final polymer products with differing group functionality.
Figure 11:
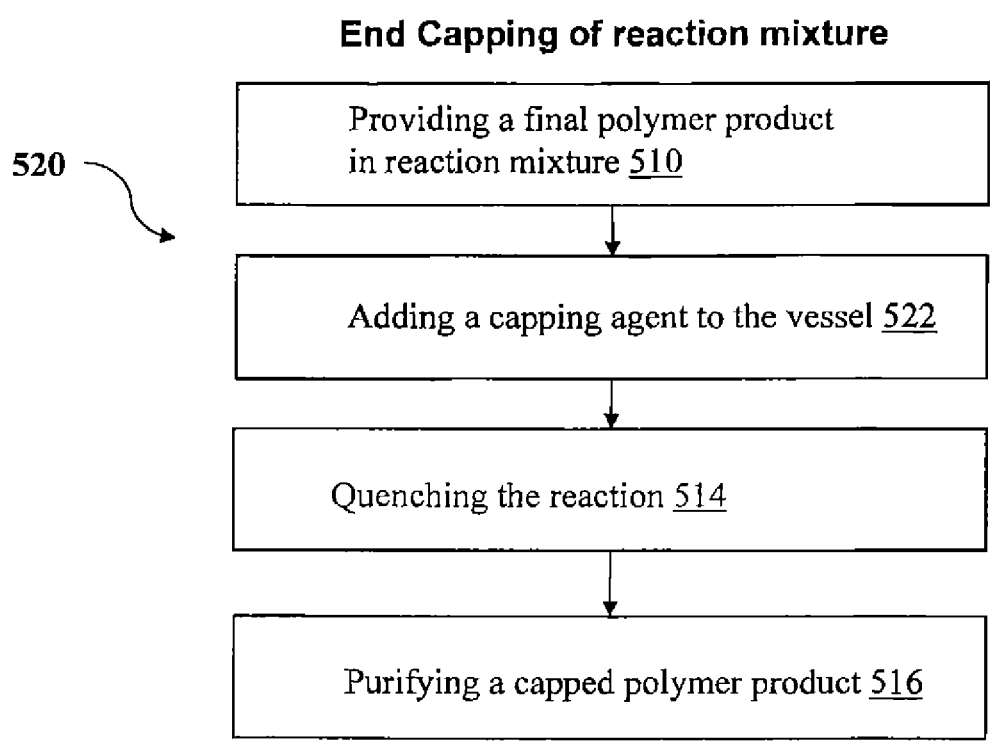
FIG. 11 depicts an exemplary mechanism for a polymer functionalizing end capping reaction.

The general reaction of the methods as in 100, 200, 300, and 400 may be completed with a similar reaction set up and reagents. With reference to FIG. 9, steps for carrying out one or more of the methods 100, 200, 300, and 400 is provided. FIG. 6 references a path of flow of the reaction mixture through the apparatus 10, where a computer may be employed to, for example, control the flow rate through the pump 40 and to collect and process data from the analytical instrument 70. FIG. 1 provides a block diagram of an exemplary reaction set-up which may be used to practice or complete one or more of the methods 100, 200, 300, 400 of the present invention. FIG. 11 depicts an illustration of an embodiment of an apparatus for performing one or more of the methods, as discussed. With reference to the figures and to one or more of the methods 100, 200, 300, 400, as previously disclosed, the reaction components and reagents will be discussed in further detail.

The reactions which are encompassed in the methods 100, 200, 300, 400 of the present invention take place in a reaction vessel 20. The reaction vessel 20 may be of any control volume as is desired, and may be of any size, shape, or dimension, as is known in the art. The reaction vessel 20 may be configured to include a stirrer (e.g. agitator 28) to mechanically agitate the reaction mixture, one or more addition funnels to add one or more components or reagents to the mixture over time, a heating/cooling jacket/element, and an inlet and outlet for the flow of a gas 14 through the reaction vessel 20. Further, the reaction vessel 20 may be configured such that an analytical instrument 70 may be fitted thereto in order to, for example, obtain an inline or in situ sample of the reaction mixture.

The external converter of the reaction apparatus 10 may be associated, attached, or integral to the reaction vessel 20 such that the reaction mixture may be transported or otherwise manipulated from the reaction vessel 20 to the external converter 30. The external converter 30 may also be in a closed system with the reaction vessel 20 such that the two components may share the same atmospheric conditions. The external converter 30 may also interchangeably be referred to as, for example, a catalytic converter or an external catalytic converter. The external converter 30 may be kept separate from the reaction vessel 20 in order to, for example, control the rate by which the reaction mixture may flow through the external converter 30.

The external converter 30 may house a solid catalyst 16 which is employed as a reagent in one or more of the various methods 100, 200, 300, 400 of the present invention. The catalyst 16 may take on one or more size, shape, and relative character, as may be desired, in order to facilitate a greater surface area contact between the reaction mixture and the catalyst 16 to effectively, efficiently, and predictably drive the reaction towards completion at a high yield, purity, and other desirable characteristics. The external catalytic converter 30 may tame the process by controlling the speed in which the mixture is put into contact with the catalyst 16. That is, by controlling the rate through which the reaction mixture is fed into the external catalytic converter 30, the rate of reaction rate of exotherm in the reaction vessel 20, and overall reaction conditions may be controlled. In contrast, without such control the exotherm of the reaction vessel 20 may get too hot, such that as a result, the monomers or solvents can boil off. Loss of solvent may in turn result in a lower disproportionation of the catalyst, while loss of one or more monomer types may lead to unknown levels of the constituents in the monomer blends. These factors contribute to less predictable molecular weight range, slower polymerization, and/or lower conversion.

There may be more than one external catalytic converter 30 connected to the apparatus 10 or otherwise associated with the reaction vessel 20 of the present invention. For a plurality of external catalytic converters, the converters may be arranged in series, parallel, or alternate to one another certain external catalytic converters may be connected, but not used until necessary. For example, during large scale production, when one converter 30 dwindles in available surface area of catalyst 16, the flow of the reaction mixture may be diverted and continued on to the next converter. Each of the converters may be purged with inert gas 14 separately in order to promote reaction conditions consistent with the reaction vessel 20 to drive the reaction forward and reduce less desirable side-reactions. Preferably, the methods 100, 200, 300, 400 of the present invention should be performed in an inert atmosphere in order to reduce side-reactions and promote high yields and predictable results. Thus, the reaction vessel 20, the external converter 30, and any other components attached thereto should be thoroughly purged with non-reactive gas 14, i.e. inert gas, prior to the initiation of one or more of the reactions pursuant to the embodiments of the present invention. Thus, the methods 100, 200, 300, 400 may preferably be performed in the substantial absence of oxygen. That is, the reaction vessel 20 and external catalytic converter 30 may be purged with a non-reactive and/or inert gas 14 prior to the addition of reagents and initiation of the polymerization process. Such gases may include, for example, argon or nitrogen. Also, the reaction vessel may be continually purged with a non-reactive gas while the methods 100, 200, 300, 400 of the present invention are performed. Similarly, the reaction may be performed under a substantial vacuum, under positive pressure, or under an otherwise closed control volume which is impermeable to oxygen.

Generally, the higher the temperature, the faster the reaction rate of the reactions according to the present invention. However, a current disadvantage in the art is that with the reaction mixture at an elevated temperature, there is less control over the reaction. Thus, the various embodiments of the present invention, including for example, the external catalytic converter 30 and one or more heat exchangers 50 facilitates great control over the temperature of the reaction mixture. The methods of the present invention may be done consistently and accurately at controlled, lower temperatures. Therefore, the final polymer products of the present invention solve the current disadvantages as a controlled temperature promotes: a controlled exotherm; decreased rate of side reactions; and predictable/high yield large-scale reactions. The temperatures of the reaction mixture may be maintained at any desirable range. Preferably, the temperature may be kept around or below 40 degrees Celsius. Specifically, the present invention may be performed at a temperature as low as around 6-7 degrees Celsius. The optimal temperature of the methods 100, 200, 300, and 400 may depend, for example, on the monomer, solvent, catalyst, and ideal molecular weight of the polymer product.

As the external converter 30 greatly facilitates the control of the reaction heat exchangers 50 may also be incorporated with the process and apparatus. For example, a heat exchanger 50 may be coupled to the external converter 30. The heat exchanger 50 may be the chief interface for reducing the exotherm, the external converter 30 may be fitted or otherwise equipped with a heat exchanger 50. Similarly, the reaction vessel 20 may be equipped with a heat exchanger 50. One or more of the methods 100, 200, 300, and 400 may be performed with one or more heat exchangers 50 in the reaction apparatus 10. This may promote efficient removal of exothermic heat from the reagent and reaction mixture, which might otherwise cause the degradation of thermally unstable reactants, boiling of low boiling point solvents, monomers, or reagents, or otherwise cause a run-away reaction in which solvent and/or reagents boil up into the glassware, condenser 60, and/or gas inlet/outlets 82/84. The heat exchanger 50 may assist in maintaining the reaction mixture within the selected temperature range. Maintaining the temperature within the selected temperature range facilitates the reaction towards conversion while maintaining a constant ratio of reagents in the reaction vessel 20. One or more heat exchangers 50 may be employed in conjunction with the external converter 30, the reaction vessel 20, and combinations thereof. As such, the temperature of the reaction mixture may be controlled within desired threshold ranges throughout the reaction sequence.

The catalyst 16 employed in the methods 100, 200, 300, and 400 may contribute to determining the position of the atom transfer equilibrium and dynamics of exchange between dormant and active species. Thus, the catalyst 16 employed should preferably be good electron donor. The catalyst 16 may be, for example: Cu(0); $Cu_2S$; $Cu_2Te$; $Cu_2Se$; Mn; Ni; Pt; Fe; Ru; V; combinations thereof, and the like, as is known in the art. Similarly, other catalysts, including, for example, Au, Ag, Hg, Rh, Co, Ir, Os, Re, Mn, Cr, Mo, W, Nb, Ta, Zn, and compounds including one or more thereof may be employed with the present methods. One particularly effective catalyst is elemental copper metal, and its derivatives.

The catalyst 16 may take one or more forms. For example, the catalyst 16 may be in the form of a wire, mesh, screen, shavings, powder, tubing, pellet, crystals, or other solid form. The catalyst surface may be one or more of a metal, as previously disclosed or metal alloy. More particularly, the catalyst 16 may be in the form of a copper wire, a copper mesh, a copper screen, a copper shaving, a copper powder, a copper gauze, a copper sinter, a copper filter, a copper sliver, a copper tubing, copper crystals, copper pellets, a coating of elemental copper on non-reactive materials, and combinations thereof.

The initiation (activation) step of the reactions of the present methods may be mediated by a single electron transfer from the elemental catalyst electron donor (or other donor species) to the electron-acceptor initiator. Under the polymerization conditions, the catalyst 16 derivatives disproportionate, and therefore, their role in catalysis may be determined by the ratio between their rate of disproportionation and direct activation by single electron transfer. The catalyst 16 may be retained in the external catalytic converter 30 in solid form, and thus used over and over.

The catalyst 16 is desirably a good reducing agent with high solubility and disproportionation in a dipolar aprotic solvent. Because the catalyst 16 is in solid form and in most desirably, kept in the external catalytic converter 30, the reactions of the present methods are easier and more efficient to purify for use in further reactions to make final products. Also, with a solid external catalyst, the surface area for contact between the reaction mixture and the catalyst is maximized and controllable, e.g. by controlling the flow rate, exposure time, and surface area of the catalyst. Thus, the reaction mixture may more efficiently and readily interact with the catalyst (good dispersion) while at the same time, the ideal reaction conditions (reduced exotherm) may be promoted. At low levels of catalyst, the polymer can be used without further purifying to remove the catalyst residues.

The methods 100, 200, 300, and 400 may also include the presence of a ligand, for example, a nitrogen-containing ligand which may aid in the extraction of the catalyst to the extent that the metal catalyst may be solubilized by the ligand so it is available in its higher oxidation state. Thus, the ligand may be desirable to drive the polymerization reaction to the effect that it may aid in promoting a mixture of the various components of the reaction mixture on a molecular level. A wide variety of nitrogen-containing ligands are suitable for use in the present invention. These compounds include primary, secondary, and tertiary alkyl or aromatic amines, as well as polyamines which may be linear, branched, or dendritic polyamines and polyamides. Suitable ligands for use in the present invention include ligands having one or more nitrogen, oxygen, phosphorus and/or sulfur atoms which can coordinate to the transition metal through a sigma-bond, and ligands containing two or more carbon atoms which can coordinate to the transition metal through a pi-bond. For example, suitable ligands may include tris(2-dimethylaminoethyl)amine (Me6-TREN), tris(2-aminoethyl)amine (TREN), 2,2-bipyridine (bpy), N,N,N,N,N-pentamethyldiethylenetriamine (PMDETA), and many other N-ligands.

The ligand may preferentially form a soluble complex with the redox conjugate of the transition metal, i.e. the higher oxidation state of the transition metal, forming a complex that is active in the deactivation of the growing radical chain, which may contribute to a narrow molecular weight distribution of the polymer product.

Initiators of the present method may initiate the free radical reaction and thusly, may be considered as contributors to the number of growing polymer chains in the reaction vessel 20. Suitable initiators include, for example, halogen containing compounds. Examples of initiators include chloroform, bromoform, iodoform, carbon tetrachloride, carbon tetrabromide, hexahalogenated ethane, mono-di, and tri haloacetates, acetophenones, halogenated amides, and polyamides such as nylons, halogenated urethanes and polyurethane including their block copolymers (RO halogenated imides, acetone, and any other initiators shown to work with conventional metal catalyzed living radical polymerization including ATRP and SET-LRP. A wide variety of initiators are suitable for use in the present invention. Halogenated compounds are particularly suited for use in the invention. These initiators include compounds of the formula R—X of "R'C(=O)OR" where X is a halogen and R is C1-C6 alkyl. For example, the initiator may include: diethyl meso-2,5-dibromoadipate; dimethyl 2,6-dibromoheptanedioate, ethylene glycol bis(2-bromopropionate); ethylene glycol mono-2-bromopropionate; trimethylolpropane tris(2-bromopropionate); pentaerythritol tetrakis (2-bromopropionate); 2,2-dichloacetophenone; methyl 2-bromopropionate; methyl 2-chloropropionate; N-chloro-2-pyrrolidinone; N-bromosuccinimide; polyethylene glycol bis (2-bromopropionate); polyethylene glycol mono(2-bromopropionate); 2-bromopropionitrile; dibromochloromethane; 2,2-dibromo-2-cyanoacetamide; α,α'-dibromo-ortho-xylene; α,α'-dibromo-meta-xylene; α,α'-dibromo-para-xylene; α,α'-dichloro-para-xylene; 2-bromopropionic acid; methyl trichloroacetate; para-toluenesulfonyl chloride; biphenyl-4,4'-disulfonyl chloride; diphenylether-4,4'-disulfonylchloride bromoform; iodoform carbon tetrachloride; and combinations thereof. In some embodiments, the initiator may be an alkyl, sulfonyl, or nitrogen halide. The nitrogen halide can be also halogenated nylon, peptide, or protein. Alternatively, a polymer containing active halide groups, for example, poly(vinyl)chloride), the chloromethyl group or polychromethylsytrene) of the polymers and copolymers can also be used as initiators.

The solvent may be implemented with the present invention in order to, for example, reduce viscosity of the reaction mixture, increase conversion of the ligand, and promote fast disproportionation of the catalyst in order to facilitate ultrafast polymerization. Further, the solvent should be non-reactive in order to prevent chain transfer, side reactions, or poisoning of the catalyst. Preferred solvents of the present methods include dipolar, protic, or aprotic solvents. Some preferred solvents include water, alcohol, natural or synthetic polymeric alcohols, dipolar aprotic solvents, ethylene carbonate, propylene carbonate, ionic liquid, or a mixture thereof. For example, such solvents may include: $H_2O$, MeOH, EtOH, ethylene glycol, diethylene glycol, triethylene glycol, 2-(2-ethoxyethoxy)ethanol, tetraethylene glycol, glycerine, HEMA, phenols, DMSO, DMF, DMAc, NMP, etc., ionic liquids, ethylene carbonate, and propylene carbonate. Suitable alcohols include methanol, ethanol, propanol, isopropanol, butanol, and tert butanol, glycerine, and other natural and synthetic polymers continuing OH groups. Desirably, the solvent or solvent blend chosen does not cause precipitation of the polymer product during the reaction.

The monomers used in the methods 100, 200, 300, and 400 may act as the building blocks of the final polymer product. Suitable alkene monomers include acrylates, halogenated acrylates, methacrylates, halogen-substituted alkenes, acrylamines, methacrylamides, vinyl sulfones, vinyl ketones, vinyl sulfoxides, vinyl aldehydes, vinyl nitriles, styrenes, and any other activated and nonactivated monomers containing electron withdrawing substituents. These monomers may be substituted. In some embodiments, the monomers optionally contain functional groups that assist in the disproportionation of the metal catalyst into other oxidation states. Functional groups may include without limitation, amide, sulfoxide, carbamate, or onium. Halogen substituted alkenes include vinyl chloride, vinylidene chloride, vinyl fluoride, vinylidene fluoride, trifluoroethylene, trifluorochloroethylene, or tetrafluoroethylene, hexafluorpropylene and fluorinated vinyl esters. Combinations of the monomers may be used. Blends of monomers may be polymerized using the embodiments of the present invention. The monomers may be blended in the reaction vessel. As an example, blends of acrylate monomers may be used with the methods of the present invention, as certain acrylates will exhibit similar reactivities, thus the end product may have a greater predictability. Blends of the final polymer product, as a two co-polymer blend, a two homopolymer blend, and a combination of at least one co-polymer and at least one homopolymer may be blended as may be desired. Further, blended polymers can be made as final products. Blended polymer products may be preferred to others because a blended copolymer may provide and promote good oil resistance in gasket fitters. Specifically, the monomer may be one or more of, for example, alkyl(meth) acrylates; alkoxyalkyl(meth)acrylates; (meth)acrylonitrile; vinylidine chloride; styrenic monomers; alkyl and alkoxyalkyl fumarates and maleates and their half-esters, cinnamates; and acrylamides; N-alkyl and aryl maleimides(meth) acrylic acids; fumaric acids, maleic acid; cinnamic acid; and combinations thereof. More specifically, the monomers used to create polymers with the embodiments of the present invention are not limited to any particular species but includes various monomers, for example: (meth)acrylic acid monomers such as (meth)acrylic acid, methyl(meth)acrylate, ethyl (meth)acrylate, n-propyl(meth)acrylate, isopropyl(meth) acrylate, n-butyl(meth)acrylate, isobutyl(meth)acrylate, tert-butyl(meth)acrylate, n-pentyl(meth)acrylate, n-hexyl(meth) acrylate, cyclohexyl(meth)acrylate, n-heptyl(meth)acrylate, n-octyl(meth)acrylate, 2-ethylhexyl(meth)acrylate, nonyl (meth)acrylate, decyl(meth)acrylate, dodecyl(meth)acrylate, phenyl(meth)acrylate, toluyl(meth)acrylate, benzyl(meth) acrylate, 2-methoxyethyl(meth)acrylate, 3-methoxybutyl (meth)acrylate, 2-hydroxyethyl(meth)acrylate, 2-hydroxypropyl(meth)acrylate, stearyl(meth)acrylate, glycidyl (meth)acrylate, 2-aminoethyl(meth)acrylate, -(methacryloyloxypropyl)trimethoxysilane, (meth)acrylic acid-ethylene oxide adducts, trifluoromethylmethyl(meth)acrylate, 2-trifluoromethylethyl(meth)acrylate, 2-perfluoroethylethyl (meth)acrylate, 2-perfluoroethyl-2-perfluorobutylethyl (meth)acrylate, 2-perfluoroethyl(meth)acrylate, perfluoromethyl(meth)acrylate, diperfluoromethylmethyl(meth) acrylate, 2-perfluoromethyl-2-perfluoroethylethyl(meth) acrylate, 2-perfluorohexylethyl(meth)acrylate, 2-perfluorodecylethyl(meth)acrylate and 2-perfluorohexadecylethyl(meth)acrylate; styrenic monomers such as styrene, vinyltoluene, .alpha.-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol, etc. The aforementioned monomers may be used singly, sequentially, or in combination. From the desirability of physical properties of products, one or more classes of monomer may be preferred.

Figure 10:
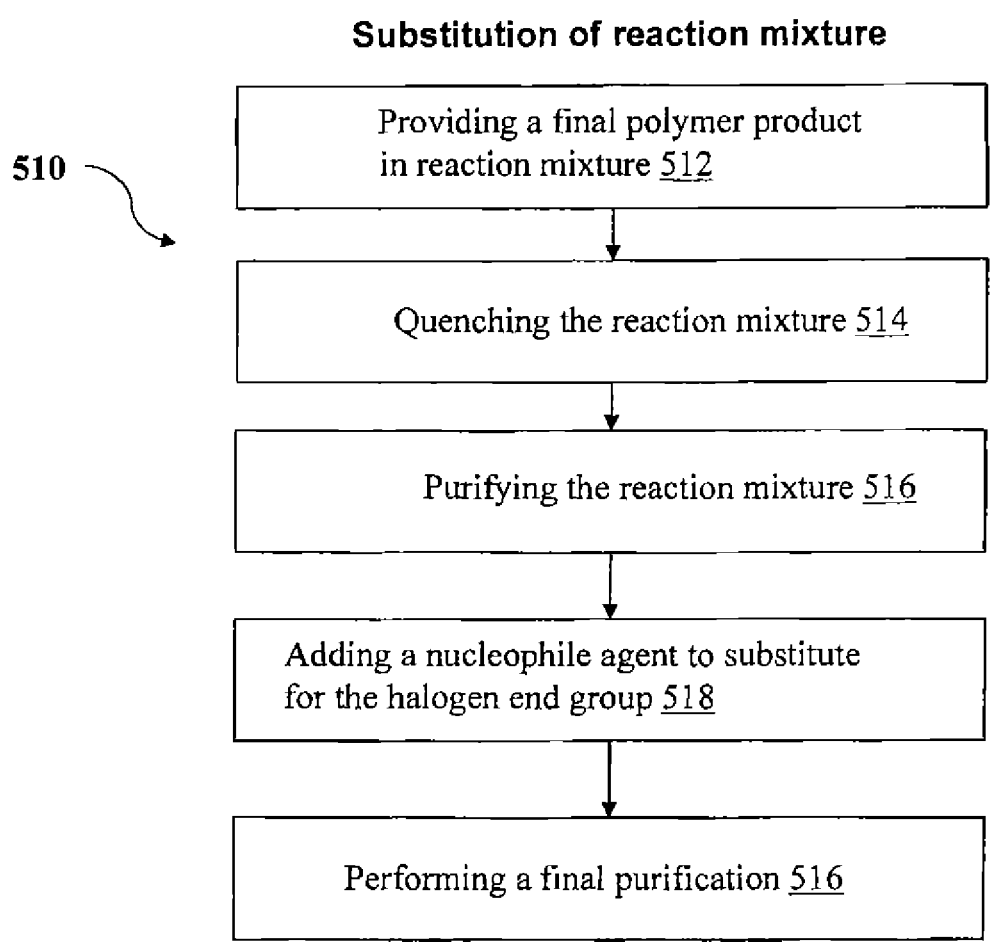
FIG. 10 depicts an exemplary mechanism for a polymer functionalizing substitution reaction.

With reference to FIGS. 9, 10, and 11, the intermediate dihalo product of the methods 100, 200, 300, and 400 may be functionalized, reinitiated for continued growth in chain length, or used as building blocks for block-copolymers. FIG. 9 provides a general step by step guide with respect to the reaction sequence of steps. While FIG. 9 may provide a general reference tool for the discussion herein, it also pictorially demonstrates the various paths that may be followed to further react the final polymer product and may be used with reference to the EXAMPLES section that follows. Once the polymerization is complete, the method may include further reacting the resultant polymer to form at least one functional end group onto the polymer. The functionality of the intermediate product creates a multi-use end product that may be converted into one or more final products. The final products may then be implemented into various commercial products or procedures, as may be desired. In order to quench the reaction and terminate the process, strong nucleophiles may be added to the reaction mixture. Such nucleophiles include, for example: thiolate, amine, azide, carboxylate, alkoxide, and sodium carboxylate. One or a combination of nucleophiles may be used as may be desired in order to terminate the reaction while maintaining chain stability and integrity. Creating functional ends on the polymer may be done, for example, by performing either an end-capping reaction or a substitution reaction.

To functionalize the final product polymer by an end-capping reaction 520, as shown in FIG. 11, the required steps may be done in situ in the reaction vessel at the end of the initial reaction, prior to work-up. To perform an end-capping functionalization of at least one polymer end, the steps include: providing 510 a final polymer product; adding 522 a capping agent to the vessel; quenching 514 the reaction; and purifying 516 a capped polymer product.

The capping agent may include one or a combination of compounds, as may be desired to cap the end group of the final product with a desired functional eng group while maintaining chain stability and integrity. For example the capping agent may include: 2 allyl alkyl ethanol, allyl alcohol, allyl glycidyl ether, 1-6 heptadiene, cyclooctyl diene, norbornadiene, and other olefins with a known tendency to not form homopolymers under SET-LRP conditions.

The quenching step may include, for example, quenching the reaction with oxygen, or with a terminating agent.

The purification step of the resulting capped polymer product may include removing catalyst from the final polymer product. Purification may be performed by running the reaction mixture including the final product through an alumina column, a silica column, activated charcoal, cross-linked polymers with copper scavenging groups, or by treating the reaction mixture with a material with a copper chelating group.

To functionalize the final product by a substitution reaction, as shown in FIG. 10, the steps may include: providing 510 a final polymer product; quenching 514 the reaction; purifying 516 the reaction mixture; substituting 518 the halogen atoms of a polymer intermediate with a nucleophile; and purifying 516 a substituted polymer product.

The quenching step may include, for example: quenching the reaction with oxygen, or with a terminating agent.

The purification step of the reaction mixture may include removing catalyst from the final polymer product. Purification may be performed by running the reaction mixture including the final product through an alumina column, a silica column, activated charcoal, cross-linked polymers with copper scavenging groups, or by treating the reaction mixture with a material with a copper chelating group.

The nucleophile agent for substitution of the halogen atoms may include, for example, phosphine, thiolate, amine, azide, carboxylate, alkoxide, and sodium carboxylate.

The final purification step may include running the reaction mixture including the final product through an alumina column. The method also includes the formation of co-polymers and/or block co-polymers. Thus, the methods includes the step of adding a sequential monomer differing from the monomer initially charged in the vessel, and reiterating steps (b) through (d) until a desired conversion level is reached. In the reaction vessel, after a first reaction has progressed to a desired level of conversion, a different monomer may be added into the reaction vessel. The reaction proceeds with the different monomer building block. As an alternative, after the reaction has progressed to a desired level of conversion, the reaction may be quenched and purified. Then to the apparatus 10, complete with fresh ligand and catalyst, the dihalo polymer product may be used with a second monomer, and the dihalo polymer product may act as a macroinitiator for the sequential polymerization. The resulting polymer may be a block co-polymer, taking one or more various forms. These forms may include, for example, telechelic polymers (polymer carrying functionalized end groups) and/or block copolymers.

The final products of the methods of the present invention include, for example, homopolymers and/or (co)polymers, which may be block, random, statistical periodic, gradient star, graft, comb, (hyper)branched or dendritic polymers. The "(co)" parenthetical prefix in conventional terminology is an alternative, viz., "(co)polymer means a copolymer or polymer, including homopolymer. Similarly "(hyper)" as used herein, refers to a comparatively high degree of dendritic-like branching along the co-polymer backbone as compared to a low degree of branching.

The present invention may be used to prepare periodic or alternating copolymers. The methods of the present invention may be particularly useful for producing alternating copolymers where one of the monomers has one or two bulky substituents, from which homopolymers may be difficult to prepare, due to steric considerations. Copolymerization of monomers with donor and acceptor properties results in the formation of products with predominantly alternating monomer structure.

So-called "alternating" copolymers can be produced using the methods 100, 200, 300, and 400 of the present invention. "Alternating" copolymers are prepared by copolymerization of one or more monomers having electron-donor properties with one or more monomers having electron acceptor type properties (acrylates, methacrylates, unsaturated nitriles, unsaturated ketones, etc.). The present random or alternating copolymer can also serve as a block in any of the present block, star, graft, comb or hyperbranched copolymers.

The end product may be characterized by one or more features, including: molecular weight, polydispersion, monomodal distribution of molecular weights, etc. One or more of the methods of the present invention may yield a polymer product having a molecular weight of 2,000 to 20,000,000 g/mol. Also, the polymer product has a monomodal distribution of polymer molecular weights. Further, the polymer product may also have a polydispersity from about 1.01 to about 2. In certain embodiments, the polymer produced by the process described herein has a number average molecular weight of at least about 500. In yet other embodiments the polymer has a number average molecular weight of at least 1,000,000.

While the invention has been described in relationship to the preferred embodiments, it will be understood by those skilled in the art that various changes may be made without deviating from the fundamental nature and scope of the invention as defined in the appended claims. Any of the embodiments disclosed herein may be used in combination with other features.

EXAMPLES

Description of Polymerization Reactor

Figure 12:
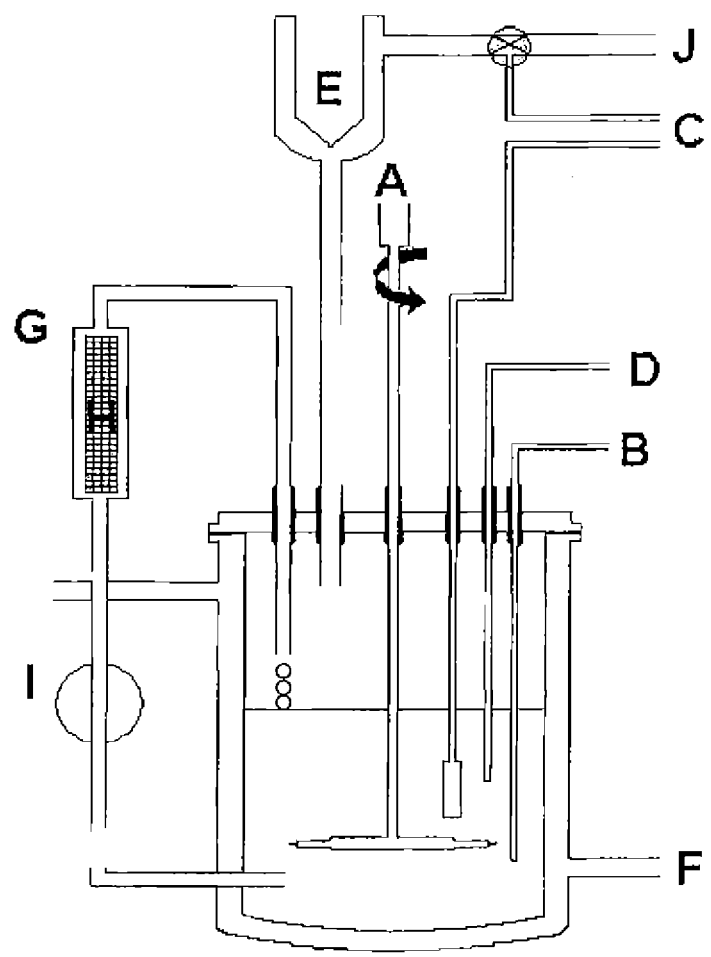
FIG. 12 depicts a schematic diagram of reactor set-up for conducting SET-LRP reactions.

The reactor set-up, shown schematically in FIG. 12, included of a doubled walled three-liter glass reactor equipped with mechanical stirrer (A), thermocouple (B), argon purge and break line (C), an ATR infra-red detector probe connected to a remote FTIR spectrophotometer by means on an IR optical light guide (D) and a dry-ice condenser (E). The polymerization mixture was contained in the inner chamber while circulating coolant (F) was pumped through the outside chamber to help control the reaction exotherm. The reactor was connected to an external steel chamber (G) containing a solid (e.g. copper) catalyst (H) on which a polymerization reaction can be initiated and sustained by pumping (I) the monomer and polymerizing mixture through the catalyst. The reactor was also equipped with a dry-ice condenser connected to a vacuum/vent line (J). FIG. 12 depicts a schematic diagram of reactor set-up for conducting SET-LRP reactions, which may be cross-referenced with FIGS. 1 and 6 and the descriptions thereof.

The experimental set-up allowed the reaction temperature to be conveniently and precisely controlled during an exothermic polymerization reaction by altering the pumping rate of the mixture through the external catalyst chamber. By reducing the flow rate, the polymerization rate was slowed and the temperature lowered. By stopping the flow altogether, the polymerization reaction may be temporarily arrested. In contrast, increased flow over the catalyst surface increases polymerization rates and temperature. The flow may be changed or suspended any number of times, as desired, during the process without adversely affecting the structure or composition of the resulting polymer or the living nature of the polymerization process. The infrared probe allowed the average monomer consumption to be measured in real time by monitoring the absorbance change at 1637 cm$^{-1}$ due to the disappearance of acrylate double bonds.

Example 1

DG 320205-W

Synthesis of 9K dibromo terminated poly(methyl acrylate) in DMSO

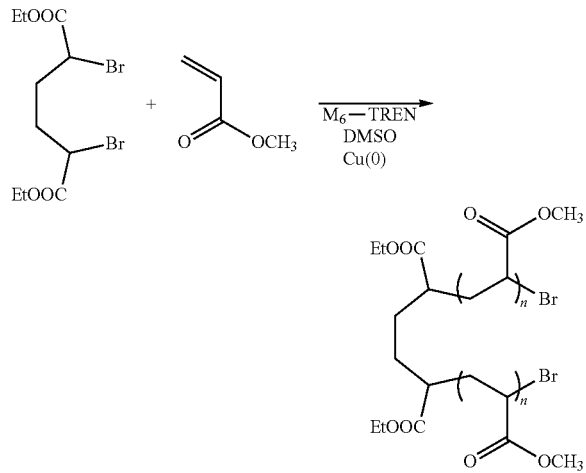

To a 3-L polymerization reactor, with external catalyst chamber (equipped as described in Example 1) was added methyl acrylate (959.90 g; 11.15 moles), DMSO (277.8 g) and tris(2-methylaminoethyl)amine (0.638 g; 11.11 mmoles). The reaction mixture was then stirred and cooled to 3° C. and evacuated at 30 torr for 45 minutes under argon bleed purge (or until reaction slightly refluxes at overhead dry ice cold finger containing a mixture of acetone and dry ice). The vacuum was broken with argon and under small positive pressure of argon relative to atmosphere, diethyl meso-2,5-dibromoadipate (40.00 g; 0.11 moles) was added. The resultant mixture was stirred and evacuated at 30 torr for 20 minutes under argon bleed purge at which stage the adipate had fully dissolved. The vacuum was broken with argon. The stirred mixture was then pumped at a rate of 400 mL/minute through an external catalyst chamber containing a roll of 30×30 mesh copper screen having dimensions 40.6×8.9×0.03 cm$^3$.

Figure 13:
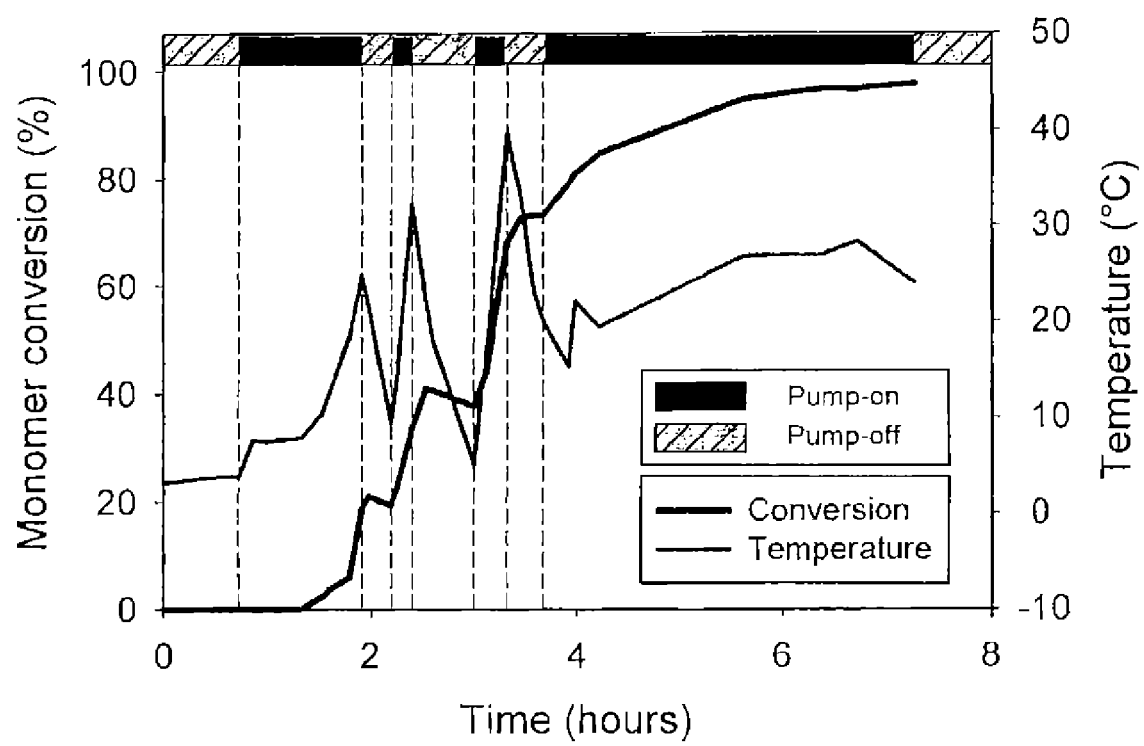
FIG. 13 depicts the time-temperature and conversion profiles for polymerization of methyl acrylate with controlled intermittent pumping through using external catalyst chamber.

After an induction time of 0.6 hours, the reaction temperature and monomer conversion began to increase rapidly (FIG. 13). After pumping for 1.2 h, the reaction temperature and monomer conversion had increased to 26° C. and 20% respectively. At this time, the catalyst pump was shut down and almost immediately, the reaction exotherm subsided and consumption of monomer stopped. After a further 0.3 h, the temperature of the stirred mixture had fallen to 9° C. and the pumping was restarted. The polymerization reaction immediately resumed. After an additional 0.5 h of pumping (at 200 ml/min), the reaction temperature and monomer conversions were 41° C. and 36% respectively. The catalyst pump was again shut down and again, almost immediately, the reaction exotherm subsided and consumption of monomer stopped. When the catalyst pump was started and stopped for a third and forth time (at 400 ml/min), the reaction exotherm and monomer conversion resumed and abated accordingly until a final monomer conversion of 98% was attained. The results are shown graphically in FIG. 13, where addition of initiator is indicated by zero time (t=0).

An aliquot of the crude reaction mixture (100 g) was dissolved in dichloromethane (208 g) and filtered under pressure through a bed of neutral alumina contained in a stainless steel pressure filter. The filtrate was washed with water (3×100 mL), dried over anhydrous magnesium sulfate (20 g), filtered and the solvent removed under reduced pressure (11 torr and 50° C.) to give the dibromo-terminated polymer as a viscous liquid (30.86 g; 40% yield).

The structure of the polymer was confirmed by chromatographic and spectroscopic analyses. Size exclusion chromatography (SEC: THF; 1 mL/min; RI detector; PMMA calibration) indicated number average molecular weight ($M_n$) of 11,900 and polydispersity of 1.11. These values correspond closely to the theoretical $M_n$ of 8,900 and Poisson distribution of about 1.01. The $^1$H NMR spectrum (300 MHz; CDCl$_3$) shows three signals characteristic of the dibromo terminated polymer: (a) δ 4.23, t, [—CH(COOR)Br]; (b) δ 4.12, q, —OCH$_2$-Me); and (c) δ 3.64, s, [—C(O)—OCH$_3$]. Integration of these signals indicates end groups/initiator fragment ratio [(b)/(a)] of two and an average degree of polymerization, DP$_{ave}$, [2/3(c)/(a)] of 111. This value is very close to the corresponding theoretical value of 103 predicted from the relationship:

$$DP_{ave}=[M]/[I](f_{conv})+MW \text{ of initiator}$$

where [M]/[I] is mole ratio monomer to initiator and $f_{conv}$ represents the fractional conversion of monomer. The results indicate that within the limits of experimental error, the polymer is perfectly difunctional. FIG. 13 depicts the time-temperature and conversion profiles for polymerization of methyl acrylate with controlled intermittent pumping through using external catalyst chamber.

This experiment clearly demonstrates that intermittent pumping of polymerizing monomer through external catalyst chamber permits control of the reaction exotherm without adversely affecting the living nature of the polymerization process. The reaction occurs almost exclusively at or near the solid catalyst surface contained in the external chamber and comparatively, not as much in the reaction medium isolated from the catalyst. Rapid polymerization of a volatile monomer, methyl acrylate, was achieved at low temperatures and high conversions by the process. Furthermore, the low polydispersity and almost equivalent values of theoretical and experimental molecular weights, confirms that the process is living.

Example 2

DG 311370-2

Synthesis of 17K dibromo-terminated 5/3/2 EA/MEA/BA terpolymer

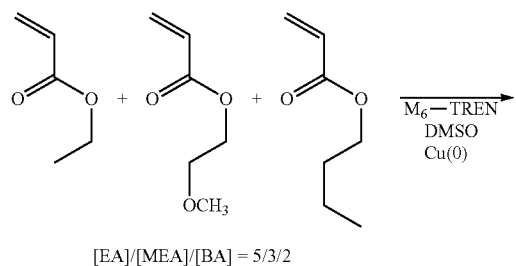

[EA]/[MEA]/[BA] = 5/3/2

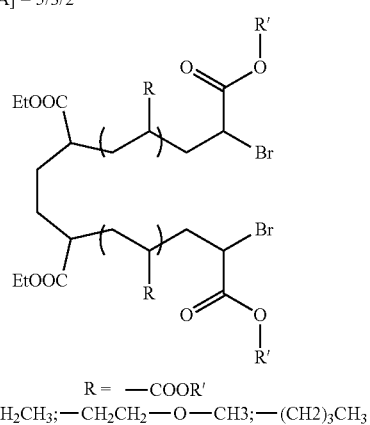

R = —COOR'
R' = —CH$_2$CH$_3$; —CH$_2$CH$_2$—O—CH3; —(CH2)$_3$CH$_3$

To a 3-L polymerization reactor described above was added ethyl acrylate (854.4 g; 8.53 moles), 2-methoxyethyl acrylate (666.3 g; 5.12 moles), n-butyl acrylate (437.5 g; 3.41 moles), dimethyl sulfoxide (DMSO; 541.5 g; 6.93 moles) and tris(2-methylaminoethyl)amine (1.356 g; 5.89 mmoles) (Me$_6$-TREN; prepared as described by M. Ciampolini, *Inorg. Chem.* 1966, 5 (1), 41). The reaction mixture was stirred and cooled to 10° C. and evacuated at 20 torr for 45 minutes under argon bleed purge. The vacuum was broken with argon and under small positive pressure of argon relative to atmosphere, diethyl meso-2,5-dibromoadipate (42.38 g; 0.118 moles) was added. The resultant mixture was stirred and evacuated at 20 torr for 30 minutes under argon bleed purge at which stage the adipate had fully dissolved. The stirred mixture was then pumped at a rate of 400 mL/minute through an external catalyst chamber containing a roll of 30×30 mesh copper screen having dimensions 43.7×7.6×0.03 cm$^3$. After 2 hours, the pumping rate was decreased to 200 mL/minute and the reaction solution developed a green color. Over the next 1.5 hours, the reaction temperature increased to 40° C. and the IR absorbance at ~1637 cm$^{-1}$, due to acrylate double bond, was observed to diminish, as the polymerization reaction occurred. The catalyst pump was stopped and the reaction immediately slowed down drastically and stopped within 20 minutes as indicated by the IR absorbance at ~1637 cm$^{-1}$, (at 75.4% conversion). A 30×30 mesh copper screen having dimensions 15.2×2.5×0.03 cm was lowered into the reaction. The reaction mixture was allowed to cool to 23° C. and maintained at that temperature for an additional 13 hours, at which time >99% consumption of the monomers was observed (disappearance of absorbance band at 1635 cm$^{-1}$ in IR spectrum). The crude polymer mixture was transferred to a 5-liter container, diluted with dichloromethane (2.5 L) and fed under pressure through a bed of neutral alumina (1 kg) contained in a stainless steel pressure filter. The dichloromethane and some of the DMSO were removed under reduced pressure (11 torr and 50° C.) to give the crude dibromo-terminated terpolymer as a viscous liquid (1,876 grams; 83% by weight dibromo-terminated polymer and 17% by weight DMSO; 73% estimated yield of polymer). The structure and composition of the product were confirmed by infrared and $^1$H NMR spectroscopy and size exclusion chromatography (SEC) as outlined below.

IR (ATR mode): IR confirms peaks@~1661 cm$^{-1}$ and ~1637 cm$^{-1}$ associated with the acrylate double have been consumed.

$^1$H NMR (300 MHz; CDCl$_3$) δ 4.28, t, shoulder on δ 3.90-4.30 [—CH(COOR)Br]; δ 3.90-4.30, 350H (—OCH$_2$—); δ 3.53, m, 103H (—CH$_2$OMe); δ 3.32, s, 148H (—OCH$_3$); δ 2.29, broad m, 178H {backbone α-methine [(—CH(COOR)CH$_2$]$_n$}; δ 1.26-1.97, m; {backbone β-methylene [(—CH(COOR)CH$_2$]$_n$, —CH$_2$CH$_2$— butyl and adipate}; δ 1.21, t, (—CH$_3$ ethyl); δ 0.90, t, 92H.

SEC (THF; 1 mL/min; RI detector): average M$_n$ (PMMA calibration)=19,800; polydispersity=1.24 (monomodal distribution); M$_n$(theory)=17,100.

Example 3

RC 316919

Synthesis of acrylate end-functionalized 17K polyacrylate terpolymer

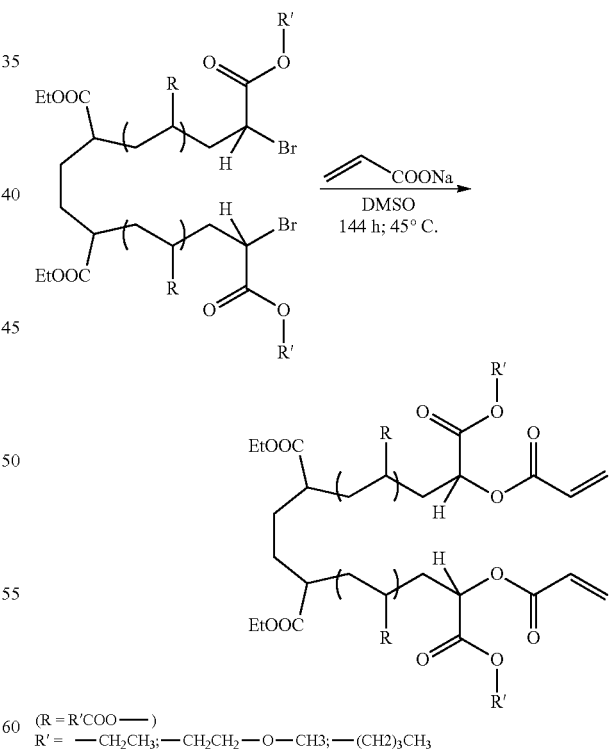

(R = R'COO—)
R' = —CH$_2$CH$_3$; —CH$_2$CH$_2$—O—CH3; —(CH2)$_3$CH$_3$

To a 5-L glass reactor equipped with a mechanical stirrer and a double turbine blade, thermocouple, reflux condenser and heating mantel was added 4-methoxyphenol (0.32 g; 0.026 moles), dibromo-terminated acrylate terpolymer of Example 1 (1,546.00 g) and DMSO (2,319 g). The mixture was stirred and heated at 45° C. for about one hour to dissolve the polymer, after which pulverized sodium acrylate (73.45 g; 0.78 moles) was added. Heating and stirring were continued for an additional 144 hours. Celite (45 g) was added, the mixture stirred for 25 minutes and filtered under pressure. The filtrate was transferred to a distillation flask and concentrated on a rotary evaporator by removal of 772 g of DMSO (70° C. and ~20 torr). The concentrated solution was transferred to a 12-L flask fitted with mechanical stirrer, diluted with 3.3 L dichloromethane and washed with 3×3.3 L water. The dichloromethane solution was processed in a centrifuge at 2,000 rpm for 30 minutes and residual water separated. Magnesium sulfate (150 g) was added, the mixture filtered under pressure and the solvent removed under reduced pressure to yield a slightly hazy, liquid polymer having acrylate groups substituted at the chain ends (1,202 g; 78% yield). The structure and composition of the polymer were confirmed by infrared and $^1$H NMR spectroscopy and size exclusion chromatography as outlined below. The average number of terminal acrylate groups per polymer chain was estimated from NMR spectrum to be 1.9.

IR (ATR mode): 1727 cm$^{-1}$ ester carbonyl of polyacrylate.

$^1$H NMR (300 MHz; CDCl$_3$): δ 6.45, d, 2H (C1 terminal alkene; cisoid); δ 6.15, m, 1H (C2 terminal alkene); δ 5.90, d, 2H (C1 terminal alkene; transoid); δ 5.00, m, 2H (C4 methine, α-ester); δ 3.90-4.30, m, 309H (—OCH$_2$—) (Estimated average $M_n$ from NMR spectrum=18,200).

SEC (THF; 1 mL/min; RI detector): average $M_n$ (PMMA calibration)=20,600; polydispersity=1.30 (monomodal distribution).

Example 4

DG 311388

Synthesis of 30K dibromo-terminated 5/3/2 EA/MEA/BA terpolymer

To a 3-L polymerization reactor described above was added ethyl acrylate (431.3 g; 4.31 moles), 2-methoxyethyl acrylate (336.6 g; 2.58 moles), n-butyl acrylate (220.8 g; 1.72 moles), dimethyl sulfoxide (DMSO; 273.4 g; 3.50 moles) and tris(2-methylaminoethyl)amine (0.428 g; 1.86 mmoles) The reaction mixture was stirred and cooled to 10° C. and evacuated at 20 torr for 45 minutes under argon bleed purge. The vacuum was broken with argon and under small positive pressure of argon relative to atmosphere, diethyl meso-2,5-dibromoadipate (13.36 g; 0.0371 moles) was added. The resultant mixture was stirred and evacuated at 20 torr for 30 minutes under argon bleed purge at which stage the adipate had fully dissolved. The stirred mixture was then pumped at a rate of 500 ml/minute through an external catalyst chamber containing a roll of 30×30 mesh copper screen having dimensions of 38.6×17.8×0.03 cm. The reaction slowly exothermed to 28.8 C then slowly cooled to 25 C over 11.7 hours at which time the reaction had reached 92.7% conversion (The IR absorbance at ~1637 and 1621 cm$^{-1}$, due to acrylate double bond, was observed to diminish, as the polymerization reaction occurred). The pump was stopped and a catalyst consisting of a 30×30 mesh copper screen having dimensions 2.54× 15.24×0.03 cm was then lowered into the reactor to supply a continuous low level of Cu(0) to the reaction overnight. After an additional 12.1 hours the reaction had reached 98.6% conversion as indicated by IR (The disappearance of IR absorbance at ~1637 and 1621 cm$^{-}$1 associated with the acrylate double bond).

The crude dibromo terpolymer was isolated as described in Example 1 (822 grams crude polymer containing ~15% DMSO, 82% yield of bromo-terminated polyacrylate). SEC analysis showed the terpolymer to have a number average molecular weight ($M_n$) of 30,200 and polydispersity of 1.13 (monomodal). Analysis of the polymer by inductively coupled plasma emission spectroscopy (ICP-AES) indicated residual copper level to be less than 1 ppm (lower detection limit of method).

Example 5

RC 316928

Synthesis of acrylate end-functionalized 30K polyacrylate terpolymer

To a 0.5-L glass jacketed reactor equipped with a mechanical stirrer and a double turbine blade, thermocouple, reflux condenser was added dibromo-terminated acrylate terpolymer from Example 4 (156.40 g), DMSO (242.6 g) and 4-methoxyphenol (0.051 g). The mixture was stirred and heated at 45° C. for about one hour to dissolve the polymer, after which pulverized sodium acrylate (4.87 g; 0.052 moles) was added. Heating and stirring were continued for an additional 96 hours, at which time the reaction mixture was cooled to 23° C., diluted with dichloromethane (1,620 g) and filtered through a bed of Celite to remove insoluble salts. The filtrate was washed with 3×1.0 L of water using a centrifuge to accelerate the separation of the organic and aqueous phases after each washing. The organic fraction was dried with magnesium sulfate, filtered and the solvent removed under reduced pressure to give the required acrylate-terminated terpolymer as yellow colored viscous liquid (102.54 g; 67%). The structure and composition of the polymer was confirmed by $^1$H-NMR and SEC analyses as outlined below. The average number of terminal acrylate groups per polymer chain was estimated from NMR spectrum to be 1.8.

$^1$H NMR (300 MHz; CDCl$_3$): δ 6.45, d, 2H (C1 terminal alkene; cisoid); δ 6.15, m, 1H (C2 terminal alkene); δ 5.90, d, 2H (C1 terminal alkene; transoid); δ 5.00, m, 2H (C4 methine, α-ester); δ 3.90-4.30, m, 534H (—OCH$_2$—) (Estimated average $M_n$ from NMR spectrum=30,900).

SEC (THF; 1 mL/min; RI detector): average $M_n$ (PMMA calibration)=30,200; polydispersity=1.15 (monomodal distribution).

Example 6

RC 316930

Synthesis of methacrylate end-functionalized 30K polyacrylate terpolymer

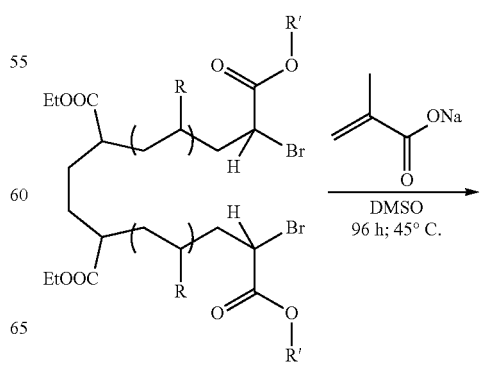

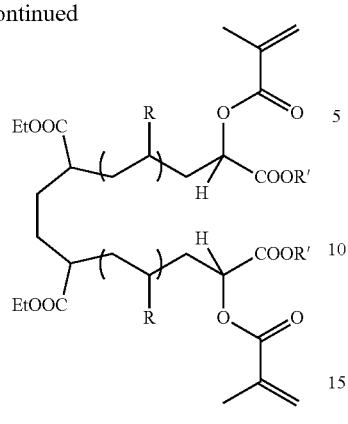

(R = R'COO—)

To a 0.5-L glass jacketed reactor equipped with a mechanical stirrer and a double turbine blade, thermocouple, reflux condenser was added dibromo-terminated acrylate terpolymer from Example 4 (156.40 g), DMSO (349.6 g) and 4-methoxyphenol (0.051 g). The mixture was stirred and heated at 45° C. for about one hour to dissolve the polymer, after which pulverized sodium methacrylate (5.60 g; 0.052 moles) was added. Heating and stirring were continued for an additional 96 hours, at which time the reaction mixture was cooled to 23° C., diluted with dichloromethane (750 g) and filtered to remove insoluble solids. The filtrate was washed with 3×1.0 L of water using a centrifuge to accelerate the separation of the organic and aqueous phases after each washing. The organic fraction was dried with magnesium sulfate, filtered and the solvent removed under reduced pressure to give the required methacrylate-terminated terpolymer as yellow colored viscous liquid (88.21 g; 59%). The structure and composition of the polymer was confirmed $^1$H-NMR and SEC analyses as outline below. The average number of terminal methacrylate groups per polymer chain was estimated from NMR spectrum to be 1.7.

$^1$H NMR (300 MHz; CDCl$_3$) δ 6.15, s, 2H (C1 terminal alkene); δ 5.60, s, 2H (C1 terminal alkene); δ 5.00, m, 2H (C4 methine, α-ester); δ 3.90-4.30, m, 554H (—OCH$_2$—) (Estimated average M$_n$ from NMR spectrum=32,000).

SEC (THF; 1 mL/min; RI detector): average M$_n$ (PMMA calibration)=29,900; polydispersity=1.13.

Example 7

DG 320212-W

Synthesis of 9K dibromo terminated poly(methyl acrylate) in methanol

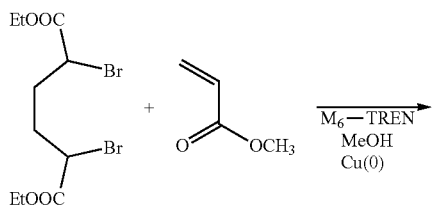

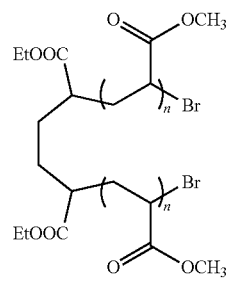

To a 3-L polymerization reactor, with external catalyst chamber (equipped as described in Example 1) was added methyl acrylate (959.90 g; 11.15 moles), methanol (386.3 g) and tris(2-methylaminoethyl)amine (2.56 g; 11.11 mmoles). The reaction mixture was then stirred and cooled to 3° C. and evacuated at 50 torr for 45 minutes under argon bleed purge (or until reaction slightly refluxes at overhead dry ice cold finger containing a mixture of acetone and dry ice). The vacuum was broken with argon and under small positive pressure of argon relative to atmosphere, diethyl meso-2,5-dibromoadipate (40.00 g; 0.11 moles) was added. The resultant mixture was stirred and evacuated at 45 torr for 20 minutes under argon bleed purge, at which stage the adipate had fully dissolved. The vacuum was broken with argon. The stirred mixture was then pumped at a rate of 400 mL/minute through an external catalyst chamber containing a roll of 30×30 mesh copper screen having dimensions 40.6×8.9×0.03 cm. After 1.2 hours, the jacket temperature was increased to 20° C. and a steady polymerization reaction occurred over about 2 hours. During this period the reaction exotherm peaked at 43° C. and absorbance peaks at 1637 and 1621 cm$^{-1}$ in the infrared spectrum decreased corresponding to a monomer conversion of 85%. The jacket temperature was maintained at 25° C. The monomer conversion increased to 88% over the next 1.5 hours. A portion of the reaction mixture (80.85 g) was removed and an additional amount of tris(2-ethylaminoethyl) amine (0.697 g; 3.03 mmoles) was added to the mixture. The reaction was continued for an additional 4 hours, at which time the monomer consumption was >98% (crude polymer solution).

An aliquot (96 g) of the polymer solution was removed and the solvents distilled under reduced pressure (11 torr and 50° C.) to isolate the crude polymer (69.9 g). The polymer sample was dissolved in dichloromethane (208 grams) and filtered under pressure through a bed of neutral alumina (100 grams) contained in a stainless steel pressure filter. The filtered solution was washed with water (3×100 mL), dried over anhydrous magnesium sulfate (20 g), filtered and the solvents removed under reduced pressure (11 torr and 50° C.) to give the dibromo-terminated polymer as a highly viscous liquid/semi-solid (53.1 g; 76% projected yield). The structure of the polymer was confirmed by NMR and IR spectral analyses.

SEC (THF; 1 mL/min; RI detector): average M$_n$ (PMMA calibration)=11,883 polydispersity=1.11.

Example 8

DG 320212

Synthesis of hydroxy end functional 9K poly(methyl acrylate)

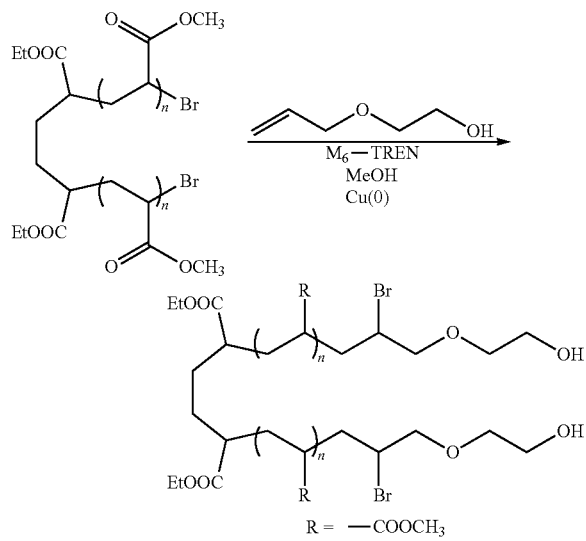

To the remaining crude polymer solution of Example 6 was added an additional amount of tris(2-methylaminoethyl) amine (0.62 g; 2.7 mmoles) and 2-allyloxyethanol (95.8 g; 0.94 moles) and the mixture was pumped through the external catalyst chamber for an additional 12 hours. The reaction mixture was diluted with THF (3 L) and filtered twice through a bed neutral alumina (1 kg). The alumina bed was flushed with additional THF (1 L), the combined filtrates were evaporated under reduced pressure to remove solvent and residual unreacted 2-allyloxyethanol and the required di-hydroxyl terminated poly(methyl acrylate) isolated as a highly viscous liquid (700 g; 63% yield).

Comparative Example 1

Synthesis of acrylate end-functionalized 20K polyacrylate terpolymer via ATRP

Figure 14:
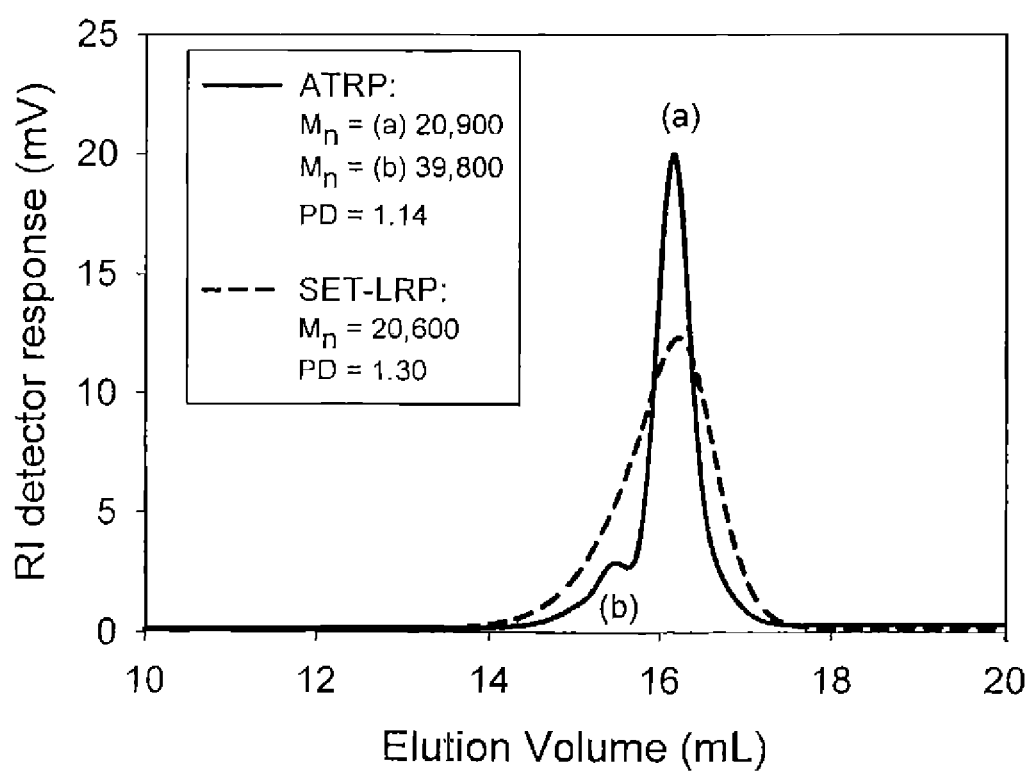
FIG. 14 depicts SEC chromatograms of polymers synthesized by ATRP and SET-LRP.

An acrylate-terminated terpolymer of ethyl, 2-methoxyethyl and butyl acrylates in the same proportions as described in Example 2, was synthesized by atom transfer radical polymerization (ATRP) method according to the method described in CA Patent 2,540,698 using cuprous bromide as catalyst. IR and $^1$H NMR showed the polymer to be structurally similar to the product obtained in Example 3. However SEC analysis indicated a bimodal distribution of molecular weights, a low molecular weight component, Mn=20,900, close to the theoretically predicted value of 20,000 and a higher molecular weight component, Mn=39,800 in the approximate ratio 10/1. This result is in contrast with that of Example 3, where the corresponding polymer produced by SET-LRP was found to have a single distribution with Mn=20,600 close to the expected value (FIG. 14). The result suggests that a small but significant amount of inactive polymer is formed in the ATRP method with a cuprous bromide catalyst through bimolecular coupling of the active radicals. This undesirable byproduct is absent in the corresponding polymer produced by SET-LRP in Example 3. FIG. 14 depicts the contrasting SEC chromatograms of acrylate terpolymers synthesized by ATRP as in CA Patent No. 2,540,698 and SET-LRP of Example 3 (THF; 1 mL/min).

What is claimed is:

1. A method of conducting controlled radical polymerization, comprising:
   (a) Charging a vessel with a mixture of:
      At least one monomer;
      At least one solvent for said monomer;
      At least one compound capable of coordinating with a metal; and
      At least one initiator;
   (b) Directing said mixture at a flow rate over a solid catalyst surface contained in a catalyst chamber external to the vessel, said catalyst surface comprising a metal or metal compound capable of at least two oxidation states;
   (c) Monitoring the temperature of said vessel within a selected temperature range;
   (d) Adjusting said flow rate when the temperature is outside said selected temperature range; and
   (e) Allowing said polymerization to proceed until a desired conversion level is reached.

2. The method of claim 1, further comprising repeating steps (b) though (d) until the desired conversion level is reached.

3. The method of claim 1, further comprising measuring a conversion level of the reaction mixture with an analytical instrument.

4. The method of claim 1, wherein the catalyst comprises one selected from the group consisting of: Cu(0); $Cu_2S$; $Cu_2Te$; $Cu_2Se$; Mn; Ni; Pt; Fe; Ru; V; and combinations thereof.

5. The method of claim 1, further comprising the addition of at least one copper (I) compound to accelerate the polymerization.

6. The method of claim 1, wherein the catalyst surface further comprises copper metal or copper metal alloy.

7. The method of claim 1, wherein the catalyst is in the form of: a wire, a mesh, a screen, a shaving, a powder, a gauze, a sinter, a sliver, a tubing, a crystal, or combinations thereof.

8. The method of claim 1, wherein the controlled radical polymerization comprises a single electron transfer living polymerization.

9. The method of claim 1, wherein the controlled radical polymerization comprises an atom transfer radical polymerization.

10. The method of claim 1, wherein the conversion level is measured with spectroscopic analysis.

11. The method of claim 1, further wherein the method is performed in the substantial absence of oxygen.

12. The method of claim 1, further comprising purging the reaction vessel with a non-reactive gas.

13. The method of claim 1, comprising further reacting the resultant polymer to form at least one functional end group onto said polymer.

14. The method of claim 1, further comprising the step of adding a sequential monomer differing from the monomer initially charged in the vessel, and reiterating steps (b) through (d) until a desired conversion level is reached.

15. The method of claim 1, further comprising forming a polymer product having a monomodal distribution of polymer molecular weights.

16. The method of claim 1, further comprising forming a polymer product having a polydispersity from about 1.01 to about 2.

17. A method of conducting controlled radical polymerization, comprising:
(a) charging a vessel with a mixture of:
   At least one monomer;
   At least one solvent for said monomer;
   At least one compound capable of coordinating with a metal; and
   At least one initiator;
(b) directing said mixture at a flow rate through at least one catalytic converter chamber external to the vessel, said catalytic converter chamber being separated from said vessel by at least one heat exchanger unit, and over a catalytic converter surface, said catalytic converter surface comprising a metal or metal compound capable of at least two oxidation states;
(c) monitoring the temperature of said vessel within a selected temperature range; and
(d) maintaining the temperature of the mixture by adjusting said flow rate through the catalytic chambers and heat exchanger units when the temperature is outside said selected temperature range.

18. The method of claim 17, further comprising directing said reaction mixture through a series of catalytic converter chambers external to said reaction vessel.

19. The method of claim 17, further comprising directing said reaction mixture through a plurality of heat exchanger units placed in between two or more catalytic converters.

20. The method of claim 17, further comprising directing said reaction mixture through a series of alternating heat exchanger units and catalytic converter chambers.

21. The method of claim 17, further comprising measuring a conversion level with an analytical instrument.

22. The method of claim 21, wherein the analytical instrument is selected from the group consisting of: a spectroscopy device, a chromatography instrument, nuclear magnetic resonance instrument, a mass spectronomer instrument, and combinations thereof.

23. The method of claim 21, wherein the analytical instrument is a fourier transform infrared spectronomer.

24. The method of claim 1, further comprising between the steps (b) and (c) determining when a desired level of catalyst is solubilized into said reaction mixture, and subsequently incorporating at least one initiator into the reaction mixture.

* * * * *